United States Patent
Luo et al.

(10) Patent No.: US 12,381,699 B2
(45) Date of Patent: Aug. 5, 2025

(54) GAP DETERMINING METHOD AND DEVICE

(71) Applicant: HUAWEI TECHNOLOGIES CO., LTD., Shenzhen (CN)

(72) Inventors: Zhihu Luo, Beijing (CN); Jun Li, Shanghai (CN); Yubo Yang, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 538 days.

(21) Appl. No.: 17/886,813

(22) Filed: Aug. 12, 2022

(65) Prior Publication Data
US 2022/0385442 A1    Dec. 1, 2022

Related U.S. Application Data

(63) Continuation of application No. PCT/CN2020/075429, filed on Feb. 14, 2020.

(51) Int. Cl.
*H04L 5/00* (2006.01)

(52) U.S. Cl.
CPC .......... *H04L 5/0098* (2013.01); *H04L 5/0048* (2013.01)

(58) Field of Classification Search
CPC .... H04L 5/0098; H04L 5/0048; H04W 72/23; Y02D 30/70
See application file for complete search history.

(56) References Cited

U.S. PATENT DOCUMENTS

2019/0281588 A1   9/2019   Zhang et al.
2020/0267754 A1*  8/2020   Liu .......................... H04W 8/24

FOREIGN PATENT DOCUMENTS

| CN | 108541359 A | 9/2018 |
| CN | 109155727 A | 1/2019 |
| CN | 110199561 A | 9/2019 |

(Continued)

OTHER PUBLICATIONS

ZTE, "Summary on Multiple TB scheduling enhancement for NB-IoT", 3GPP TSG RAN WG1 Meeting #99 R1-1913406, Nov. 25, 2019, total 15 pages.

(Continued)

*Primary Examiner* — Justin T Van Roie
(74) *Attorney, Agent, or Firm* — HAUPTMAN HAM, LLP

(57) ABSTRACT

A gap determining method includes: A terminal device receives first configuration information and second configuration information from a network device. The terminal device receives scheduling information from the network device. The terminal device determines a downlink gap of the first channel based on the first configuration information. The terminal device determines a first gap between the N transport blocks based on the second configuration information. When the terminal device determines that a preset condition is satisfied, the terminal device determines that a gap part that is included in the first gap and that overlaps with the downlink gap is postponed in time domain and that a gap part obtained through postponing does not overlap with the downlink gap; or when the first gap includes a gap part that overlaps with the downlink gap, the terminal device determines that the gap part belongs to the downlink gap.

20 Claims, 15 Drawing Sheets

(56) References Cited

FOREIGN PATENT DOCUMENTS

EP        3430851 A1    1/2019
WO     2017160213 A1    9/2017

OTHER PUBLICATIONS

Huawei et al., "Scheduling of multiple DL/UL transport blocks", 3GPP TSG RAN WG1 Meeting #99 R1-1911908, Nov. 9, 2019, total 9 pages.

3GPP TS 36.211 V14.13.1:"3rd Generation Partnership Project; Technical Specification Group Radio Access Network; Evolved Universal Terrestrial Radio Access (E-UTRA); Physical channels and modulation(Release 14)",Jan. 2020, total 197 pages.

3GPP TS 36.213 V16.0.0 :3rd Generation Partnership Project; Technical Specification Group Radio Access Network; Evolved Universal Terrestrial Radio Access (E-UTRA); Physical layer procedures (Release 16),Dec. 2019, total 568 pages.

3GPP TS 36.212 V16.0.0:"3rd Generation Partnership Project; Technical Specification Group Radio Access Network; Evolved Universal Terrestrial Radio Access (E-UTRA); Multiplexing and channel coding(Release 16)",Dec. 2019, total 250 pages.

3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.

International Search Report issued in corresponding International Application No. PCT/CN2020/075429, dated Sep. 10, 2020, pp. 1-10.

ZTE, Summary on Multiple TB scheduling enhancement for NB-IoT. 3GPP TSG RAN WG1 Meeting #98b, Chongqing, China, Oct. 14-18, 2019, R1-1911391, 19 pages.

Ericsson, Scheduling enhancements for LTE-MTC and NB-IoT. 3GPP TSG-RAN WG2 #108, Reno, USA, Nov. 18-22, 2019, R2-1915395, 10 pages.

Huawei, HiSilicon, Corrections on scheduling of multiple DL/UL transport blocks. 3GPP TSG RAN WGI Meeting #100-e, Feb. 24-Mar. 6, 2020, RI-2000217, 6 pages.

Extended European Search Report issued in corresponding European Application No. 20918714.5, dated Feb. 14, 2023, pp. 1-8.

* cited by examiner

GAP DETERMINING METHOD AND DEVICE

CROSS-REFERENCE TO RELATED APPLICATIONS

This application is a continuation of International Application No. PCT/CN2020/075429, filed on Feb. 14, 2020, the disclosure of which is hereby incorporated by reference in its entirety.

TECHNICAL FIELD

Embodiments of this application relate to the communication field, and in particular, to a gap determining method and a device.

BACKGROUND

An internet of things (internet of things, IoT) is "an internet through which things are connected to each other". Such a communication manner is also referred to as machine type communication (machine type communications, MTC). A user equipment (user equipment, UE) in the MTC is referred to as an MTC terminal. The internet of things is applied to a plurality of scenarios, for example, from outdoor to indoor, and from overground to underground. Therefore, many special requirements are imposed on a design of the internet of things. For example, implementation of coverage enhancement, support for a large quantity of low-rate devices, quite low costs, and low energy consumption is required.

For a user equipment that is located at a cell edge or in a basement and that has poor radio channel quality, downlink data transmission may require hundreds or even thousands of repetitions, and requires long time. A specific form of the internet of things is a narrowband internet of things (narrowband internet of things, NB-IoT). A system bandwidth of the NB-IoT is 180 kilohertz (kHz). A transmission bandwidth of a narrowband physical downlink shared channel (narrowband physical downlink shared channel, NPDSCH) is also 180 kHz. Different user equipments can occupy the NPDSCH at different time only in a time division multiplexing manner. If a user equipment with poor radio channel quality occupies a channel, a user equipment with a good coverage condition is blocked because the user equipment with the good coverage condition can receive the NPDSCH only after the user equipment with the poor radio channel quality completes receiving of data transmitted through a downlink.

Such frequent downlink repeat transmission blocks the NPDSCH because the time division multiplexing manner is used. To avoid this case, in the NB-IoT, a user equipment may determine, based on a quantity of repetitions of narrowband physical downlink control channel (narrowband physical downlink control channel, NPDCCH) search space, whether to insert a downlink gap (downlink gap, DL gap) into the NPDSCH. For example, there are two user equipments: a UE 1 and a UE 2. If the UE 1 inserts the downlink gap into the NPDSCH, the UE 2 may transmit data by using the downlink gap, to avoid a case in which the UE 2 cannot transmit the data for long time.

A single-cell point-to-multipoint (single cell point-to-multipoint, SC-PTM) technology is a multicast-based propagation technology. In the SC-PTM technology, there is a single-cell multicast traffic channel (single cell-multicast traffic channel, SC-MTCH). The SC-MTCH is a data traffic channel, and is used to transmit traffic data in multicast. On the SC-MTCH, one piece of downlink control information (downlink control information, DCI) may be used to schedule a plurality of transport blocks (transport block, TB). For example, a maximum quantity of the transport blocks scheduled by using the piece of DCI is 8. A gap is inserted after each transport block, and the gap is a gap between transport blocks.

When the downlink gap takes effect, and the gap exists between the transport blocks, how to determine the gap between the transport blocks is still a technical problem in the art.

SUMMARY

Embodiments of this application provide a gap determining method and a device, so that a terminal device and a network device can determine a gap between transport blocks, to resolve a problem that the gap between the transport blocks cannot be determined currently.

To resolve the foregoing technical problem, embodiments of this application provide the following technical solutions.

According to a first aspect, an embodiment of this application provides a gap determining method, including: A terminal device receives first configuration information and second configuration information from a network device, where the first configuration information is used to indicate a gap of a transport channel, and the second configuration information is used to indicate a gap between transport blocks. The terminal device receives scheduling information from the network device, where the scheduling information is used to schedule N transport blocks carried on a first channel, and N is a positive integer. The terminal device determines a downlink gap of the first channel based on the first configuration information. The terminal device determines a first gap between the N transport blocks based on the second configuration information. When the terminal device determines that a preset condition is satisfied, the terminal device determines that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap; or when the first gap includes a gap part that overlaps with the downlink gap, the terminal device determines that the gap part that is included in the first gap and that overlaps with the downlink gap belongs to the downlink gap.

In the foregoing solution, the preset condition provided in this embodiment of this application includes that the first gap includes the gap part that overlaps with the downlink gap. When the terminal device determines that the preset condition is satisfied, the terminal device determines that the gap part that is included in the first gap and that overlaps with the downlink gap is postponed in time domain and that the gap part obtained through postponing does not overlap with the downlink gap, so that the terminal device can determine the first gap between the N transport blocks. Further, in a backward compatibility scenario, when the network device needs to send the N transport blocks to each of two types of terminal devices, a first-type terminal device supports scheduling that is of the N transport blocks and that is performed by using one piece of scheduling information, and a second-type terminal device supports scheduling that is of the N transport blocks and that is performed by using N pieces of scheduling information. After the 1$^{st}$ transport block in the N transport blocks, the network device needs an additional resource to send N−1 pieces of scheduling information for N−1 transport blocks after the 1$^{st}$ transport block to the second-type terminal device. According to the solution in this embodiment, the gap part that is included in the first gap and that overlaps with the downlink gap is postponed in time domain, so that the network device can send the N−1 pieces of scheduling information in the gap part obtained through postponing. If the gap part that is included in the first gap and that overlaps with the downlink gap is not postponed in time domain, the network device has no resource to send the N−1 pieces of scheduling information. Therefore, the second-type terminal device cannot receive the N−1 transport blocks after the 1$^{st}$ transport block at a same resource position as the first-type terminal device, and the network device can send the N−1 pieces of scheduling information and the N−1 transport blocks after the Pt transport block to the second-type terminal device only at another resource position. That is, the network device transmits the N−1 transport blocks after the 1$^{st}$ transport block twice. Therefore, according to the solution in this embodiment, repeat transmission of a same transport block can be avoided, and network resource overheads can be reduced. Alternatively, in this embodiment of this application, when the first gap includes the gap part that overlaps with the downlink gap, the terminal device determines that the gap part that is included in the first gap and that overlaps with the downlink gap belongs to the downlink gap, so that the terminal device can determine the first gap between the N transport blocks. Because the gap part that is in the first gap and that overlaps with the downlink gap belongs to the downlink gap, a transport block may be transmitted after the downlink gap, to improve efficiency of transmitting the transport block.

In a possible implementation, the preset condition further includes at least one of the following: A value of N is greater than or equal to a first threshold, where the first threshold includes one of the following values: 2, 3, 4, 5, 6, 7, or 8; duration of the first gap is greater than or equal to a second threshold, where the second threshold is a preset value, or the second threshold is a value notified by the network device to the terminal device; duration of the first gap is less than or equal to duration of the downlink gap; starting positions of the first gap and the downlink gap are the same; or the N transport blocks are scheduled in a first manner and a second manner, where the first manner is multi-transport block scheduling, and the second manner is not multi-transport block scheduling. In this solution, the solution in this embodiment needs to be used when a quantity of TBs scheduled by using DCI is greater than the first threshold. That is, when the first gap overlaps with the DL gap, the overlapped gap part in the first gap is postponed. The first gap can be used to send, only when the duration of the first gap is large enough, scheduling information required by another terminal device. Therefore, the duration of the first gap is greater than or equal to the second threshold, so that repeat sending of the same transport block can be avoided, and the network resource overheads can be reduced. When the duration of the first gap is less than or equal to the duration of the downlink gap, the gap part that is in the first gap and that overlaps with the downlink gap further needs to be postponed, so that repeat sending of the same transport block can be avoided, and the network resource overheads can be reduced. When a starting subframe of the first gap is the same as the starting position of the downlink gap, the gap part that is in the first gap and that overlaps with the downlink gap further needs to be postponed, so that repeat sending of the same transport block can be avoided, and the network resource overheads can be reduced. Multi-transport block scheduling may be understood as a manner in which a plurality of TBs may be scheduled by using one piece of DCI. Not multi-transport block scheduling may be understood as a manner in which the plurality of TBs may not be scheduled by using the piece of DCI or a manner in which one TB is scheduled by using the piece of DCI. For the foregoing plurality of types of scheduling manners, the foregoing scheduling manners are both supported in this embodiment of this application.

In a possible implementation, the method further includes: The terminal device receives indication information from the network device. When the indication information indicates a first state, performing of the following step is triggered: When the terminal device determines that the preset condition is satisfied, the terminal device determines that the gap part that is included in the first gap and that overlaps with the downlink gap is postponed in time domain and that the gap part obtained through postponing does not overlap with the downlink gap. Alternatively, when the indication information indicates a second state, performing of the following step is triggered: When the first gap includes the gap part that overlaps with the downlink gap, the terminal device determines that the gap part that is included in the first gap and that overlaps with the downlink gap belongs to the downlink gap. In this solution, the terminal device may further receive the indication information from the network device, and determine, based on the indication information, to perform different manners of determining the first gap. The terminal device can determine the first gap based on the indication information, to resolve a problem that the first gap cannot be determined currently.

In a possible implementation, the first gap is a gap after each transport block in the N transport blocks. In this solution, the first gap is a gap after any transport block in the N transport blocks. For example, the first gap may be a gap after the last transport block in the N transport blocks. That is, the first gap exists after the last transport block in the N transport blocks. Alternatively, the first gap may not include a gap after the last transport block in the N transport blocks. That is, there is no first gap after the last transport block in the N transport blocks.

In a possible implementation, the first gap is a gap after every two transport blocks in the N transport blocks; and when the first gap includes the gap part that overlaps with the downlink gap, the terminal device determines that the gap part that is included in the first gap and that overlaps with the downlink gap belongs to the downlink gap. In this solution, the first gap is a gap after two adjacent transport blocks in the N transport blocks. For example, the first gap may be a gap after the last two transport blocks in the N transport blocks. That is, the first gap exists after the last two transport blocks in the N transport blocks. Alternatively, the first gap may not include a gap after the last two transport blocks in the N transport blocks. That is, there is no first gap after the last two transport blocks in the N transport blocks.

In a possible implementation, the method further includes: The terminal device receives, from the network device, a configuration parameter of common search space, where the common search space includes type 2A common search space. The terminal device skips monitoring a downlink control channel in the type 2A common search space in the first gap. In this solution, for the type 2A common search space, the terminal device does not monitor the downlink control channel in the type 2A common search space, to reduce power consumption of the terminal device. For example, a UE does not monitor the downlink control channel or a downlink control channel candidate in type 2A NPDCCH common search space in the first gap or a gap of 20 ms. This can reduce power consumption of the UE.

In a possible implementation, the method further includes: the terminal device skips monitoring a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20. In this solution, after the terminal device receives the first transport block, the terminal device decodes the first transport block. In this case, the terminal device does not need to monitor the downlink control channel, so that processing complexity of the terminal device can be reduced, and power consumption of the terminal device can be reduced. For example, for N TBs scheduled by using one piece of DCI, an ending moment of transmission of a UE on a downlink shared channel that carries a TB i is a subframe n, and the UE does not monitor the downlink control channel or a downlink control channel candidate from the subframe n to a subframe n+k, where k may be 12 ms or 20 ms, so that processing complexity of the UE is reduced, and the UE is prevented from monitoring the downlink control channel when decoding the TB i. In addition, power consumption of the UE can be reduced.

According to a second aspect, an embodiment of this application further provides a gap determining method, including: A network device determines first configuration information, where the first configuration information is used to indicate a gap of a first channel, the first channel carries N transport blocks, and N is a positive integer. The network device determines second configuration information, where the second configuration information is used to indicate a first gap between the N transport blocks. The network device sends the first configuration information and the second configuration information to a terminal device. The network device sends scheduling information to the terminal device, where the scheduling information is used to schedule the N transport blocks. When the network device determines that a preset condition is satisfied, the network device determines that a gap part that is included in the first gap and that overlaps with a downlink gap is postponed in time domain and that a gap part obtained through postponing does not overlap with the downlink gap, where the preset condition includes that the first gap includes the gap part that overlaps with the downlink gap; or when the first gap includes a gap part that overlaps with a downlink gap, the network device determines that the gap part that is included in the first gap and that overlaps with the downlink gap belongs to the downlink gap.

In this solution, the preset condition provided in this embodiment of this application includes that the first gap includes the gap part that overlaps with the downlink gap. When the network device determines that the preset condition is satisfied, the network device determines that the gap part that is included in the first gap and that overlaps with the downlink gap is postponed in time domain and that the gap part obtained through postponing does not overlap with the downlink gap, so that the network device can determine the first gap between the N transport blocks. Further, in a backward compatibility scenario, when the network device needs to send the N transport blocks to each of two types of terminal devices, a first-type terminal device supports scheduling that is of the N transport blocks and that is performed by using one piece of scheduling information, and a second-type terminal device supports scheduling that is of the N transport blocks and that is performed by using N pieces of scheduling information. After the Pt transport block in the N transport blocks, the network device needs an additional resource to send N-1 pieces of scheduling information for N-1 transport blocks after the $1^{st}$ transport block to the second-type terminal device. According to the solution in this embodiment, the gap part that is included in the first gap and that overlaps with the downlink gap is postponed in time domain, so that the network device can send the N-1 pieces of scheduling information in the gap part obtained through postponing. If the gap part that is included in the first gap and that overlaps with the downlink gap is not postponed in time domain, the network device has no resource to send the N-1 pieces of scheduling information. Therefore, the second-type terminal device cannot receive the N-1 transport blocks after the $1^{st}$ transport block at a same resource position as the first-type terminal device, and the network device can send the N-1 pieces of scheduling information and the N-1 transport blocks after the $1^{st}$ transport block to the second terminal device only at another resource position. That is, the network device transmits the N-1 transport blocks after the $1^{st}$ transport block twice. Therefore, according to the solution in this embodiment, repeat transmission of a same transport block can be avoided, and network resource overheads can be reduced. Alternatively, in this embodiment of this application, when the first gap includes the gap part that overlaps with the downlink gap, the network device determines that the gap part that is included in the first gap and that overlaps with the downlink gap belongs to the downlink gap, so that the network device can determine the first gap between the N transport blocks. Because the gap part that is in the first gap and that overlaps with the downlink gap belongs to the downlink gap, a transport block may be transmitted after the downlink gap, to improve efficiency of transmitting the transport block.

In a possible implementation, the preset condition further includes at least one of the following: A value of N is greater than or equal to a first threshold, where the first threshold includes one of the following values: 2, 3, 4, 5, 6, 7, or 8; duration of the first gap is greater than or equal to a second threshold, where the second threshold is a preset value, or the second threshold is a value notified by the network device to the terminal device; duration of the first gap is less than or equal to duration of the downlink gap; starting positions of the first gap and the downlink gap are the same; or the N transport blocks are scheduled in a first manner and a second manner, where the first manner is multi-transport block scheduling, and the second manner is not multi-transport block scheduling. In this solution, the solution in this embodiment needs to be used when a quantity of TBs scheduled by using DCI is greater than the first threshold. That is, when the first gap overlaps with the DL gap, the overlapped gap part in the first gap is postponed. The first gap can be used to send, only when the duration of the first gap is large enough, scheduling information required by another terminal device. Therefore, the duration of the first gap is greater than or equal to the second threshold, so that repeat sending of the same transport block can be avoided, and the network resource overheads can be reduced. When the duration of the first gap is less than or equal to the duration of the downlink gap, the gap part that is in the first gap and that overlaps with the downlink gap further needs to be postponed, so that repeat sending of the same transport block can be avoided, and the network resource overheads can be reduced. When a starting subframe of the first gap is the same as the starting position of the downlink gap, the gap part that is in the first gap and that overlaps with the downlink gap further needs to be postponed, so that repeat sending of the same transport block can be avoided, and the network resource overheads can be reduced. Multi-transport block scheduling may be understood as a manner in which a plurality of TBs may be scheduled by using one piece of DCI. Not multi-transport block scheduling may be understood as a manner in which the plurality of TBs may not be scheduled by using the piece of DCI or a manner in which one TB is scheduled by using the piece of DCI. For the foregoing plurality of types of scheduling manners, the foregoing scheduling manners are both supported in this embodiment of this application.

In a possible implementation, the method further includes: The network device sends indication information to the terminal device, where when the indication information indicates a first state, the indication information indicates the terminal device to determine, when the terminal device determines that the preset condition is satisfied, that the gap part that is included in the first gap and that overlaps with the downlink gap is postponed in time domain and that the gap part obtained through postponing does not overlap with the downlink gap; or when the indication information indicates a second state, the indication information indicates the terminal device to determine, when the first gap includes the gap part that overlaps with the downlink gap, that the gap part that is included in the first gap and that overlaps with the downlink gap belongs to the downlink gap. In this solution, the network device may send the indication information, and the terminal device may further receive the indication information from the network device, and determine, based on the indication information, to perform different manners of determining the first gap. The terminal device can determine the first gap based on the indication information, to resolve a problem that the first gap cannot be determined currently.

In a possible implementation, the first gap is a gap after each transport block in the N transport blocks. In this solution, the first gap is a gap after any transport block in the N transport blocks. For example, the first gap may be a gap after the last transport block in the N transport blocks. That is, the first gap exists after the last transport block in the N transport blocks. Alternatively, the first gap may not include a gap after the last transport block in the N transport blocks. That is, there is no first gap after the last transport block in the N transport blocks.

In a possible implementation, the first gap is a gap after every two transport blocks in the N transport blocks; and when the first gap includes the gap part that overlaps with the downlink gap, the network device determines that the gap part that is included in the first gap and that overlaps with the downlink gap belongs to the downlink gap. In this solution, the first gap is a gap after two adjacent transport blocks in the N transport blocks. For example, the first gap may be a gap after the last two transport blocks in the N transport blocks. That is, the first gap exists after the last two transport blocks in the N transport blocks. Alternatively, the first gap may not include a gap after the last two transport blocks in the N transport blocks. That is, there is no first gap after the last two transport blocks in the N transport blocks.

In a possible implementation, the method further includes: The network device sends a configuration parameter of common search space to the terminal device, where the common search space includes type 2A common search space. The network device skips sending a downlink control channel in the type 2A common search space in the first gap. In this solution, for the type 2A common search space, the terminal device does not monitor the downlink control channel in the type 2A common search space, to reduce power consumption of the terminal device. For example, a UE does not monitor the downlink control channel or a downlink control channel candidate in type 2A NPDCCH common search space in the first gap or a gap of 20 ms. This can reduce power consumption of the UE.

In a possible implementation, the method further includes: The network device skips sending a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20. In this solution, after the terminal device receives the first transport block, the terminal device decodes the first transport block. In this case, the terminal device does not need to monitor the downlink control channel, so that processing complexity of the terminal device can be reduced, and power consumption of the terminal device can be reduced. For example, for N TBs scheduled by using one piece of DCI, an ending moment of transmission of a UE on a downlink shared channel that carries a TB i is a subframe n, and the UE does not monitor the downlink control channel or a downlink control channel candidate from the subframe n to a subframe n+k, where k may be 12 ms or 20 ms, so that processing complexity of the UE is reduced, and the UE is prevented from monitoring the downlink control channel when decoding the TB i. In addition, power consumption of the UE can be reduced.

According to a third aspect, an embodiment of this application further provides a terminal device, including a transceiver module, configured to receive first configuration information and second configuration information from a network device, where the first configuration information is used to indicate a gap of a transport channel, and the second configuration information is used to indicate a gap between transport blocks, where the transceiver module is further configured to receive scheduling information from the network device, where the scheduling information is used to schedule N transport blocks carried on a first channel, and N is a positive integer; and a processing module, configured to determine a downlink gap of the first channel based on the first configuration information, where the processing module is further configured to determine a first gap between the N transport blocks based on the second configuration information; and the processing module is further configured to: when determining that a preset condition is satisfied, determine that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap; or the processing module is further configured to: when the first gap includes a gap part that overlaps with the downlink gap, determine that the gap part that is included in the first gap and that overlaps with the downlink gap belongs to the downlink gap.

In a possible implementation, the preset condition further includes at least one of the following: A value of N is greater than or equal to a first threshold, where the first threshold includes one of the following values: 2, 3, 4, 5, 6, 7, or 8; duration of the first gap is greater than or equal to a second threshold, where the second threshold is a preset value, or the second threshold is a value notified by the network device to the terminal device; duration of the first gap is less than or equal to duration of the downlink gap; starting positions of the first gap and the downlink gap are the same; or the N transport blocks are scheduled in a first manner and a second manner, where the first manner is multi-transport block scheduling, and the second manner is not multi-transport block scheduling.

In a possible implementation, the transceiver module is further configured to receive indication information from the network device; and the processing module is further configured to: when the indication information indicates a first state, trigger performing of the following step: when determining that the preset condition is satisfied, determining that the gap part that is included in the first gap and that overlaps with the downlink gap is postponed in time domain and that the gap part obtained through postponing does not overlap with the downlink gap; or the processing module is further configured to: when the indication information indicates a second state, trigger performing of the following step: when the first gap includes the gap part that overlaps with the downlink gap, determining that the gap part that is included in the first gap and that overlaps with the downlink gap belongs to the downlink gap.

In a possible implementation, the first gap is a gap after each transport block in the N transport blocks.

In a possible implementation, the first gap is a gap after every two transport blocks in the N transport blocks; and the processing module is further configured to: when the first gap includes the gap part that overlaps with the downlink gap, determine that the gap part that is included in the first gap and that overlaps with the downlink gap belongs to the downlink gap.

In a possible implementation, the transceiver module is further configured to receive, from the network device, a configuration parameter of common search space, where the common search space includes type 2A common search space; and the processing module is further configured to skip monitoring a downlink control channel in the type 2A common search space in the first gap.

In a possible implementation, the processing module is further configured to skip monitoring a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20.

In the third aspect of this application, the composition modules of the terminal device may alternatively perform the steps described in the first aspect and the possible implementations. For details, refer to the foregoing descriptions of the first aspect and the possible implementations.

According to a fourth aspect, an embodiment of this application further provides a network device, including: a processing module, configured to determine first configuration information, where the first configuration information is used to indicate a gap of a first channel, the first channel carries N transport blocks, and N is a positive integer, where the processing module is further configured to determine second configuration information, where the second configuration information is used to indicate a first gap between the N transport blocks; and a transceiver module, configured to send the first configuration information and the second configuration information to a terminal device, where the transceiver module is further configured to send scheduling information to the terminal device, where the scheduling information is used to schedule the N transport blocks; and the processing module is further configured to: when determining that a preset condition is satisfied, determine that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap; or the processing module is further configured to: when the first gap includes a gap part that overlaps with the downlink gap, determine that the gap part that is included in the first gap and that overlaps with the downlink gap belongs to the downlink gap.

In a possible implementation, the preset condition further includes at least one of the following: A value of N is greater than or equal to a first threshold, where the first threshold includes one of the following values: 2, 3, 4, 5, 6, 7, or 8; duration of the first gap is greater than or equal to a second threshold, where the second threshold is a preset value, or the second threshold is a value notified by the network device to the terminal device; duration of the first gap is less than or equal to duration of the downlink gap; starting positions of the first gap and the downlink gap are the same; or the N transport blocks are scheduled in a first manner and a second manner, where the first manner is multi-transport block scheduling, and the second manner is not multi-transport block scheduling.

In a possible implementation, the transceiver module is further configured to send indication information to the terminal device, where when the indication information indicates a first state, the indication information indicates the terminal device to determine, when the terminal device determines that the preset condition is satisfied, that the gap part that is included in the first gap and that overlaps with the downlink gap is postponed in time domain and that the gap part obtained through postponing does not overlap with the downlink gap; or when the indication information indicates a second state, the indication information indicates the terminal device to determine, when the first gap includes the gap part that overlaps with the downlink gap, that the gap part that is included in the first gap and that overlaps with the downlink gap belongs to the downlink gap.

In a possible implementation, the first gap is a gap after each transport block in the N transport blocks.

In a possible implementation, the first gap is a gap after every two transport blocks in the N transport blocks; and the processing module is further configured to: when the first gap includes the gap part that overlaps with the downlink gap, determine that the gap part that is included in the first gap and that overlaps with the downlink gap belongs to the downlink gap.

In a possible implementation, the transceiver module is further configured to send a configuration parameter of common search space to the terminal device, where the common search space includes type 2A common search space; and the processing module is further configured to skip sending a downlink control channel in the type 2A common search space in the first gap.

In a possible implementation, the processing module is further configured to skip sending a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20.

In the fourth aspect of this application, the composition modules of the network device may alternatively perform the steps described in the second aspect and the possible implementations. For details, refer to the foregoing descriptions of the second aspect and the possible implementations.

According to a fifth aspect, an embodiment of this application provides a computer-readable storage medium. The computer-readable storage medium stores instructions.

When the instructions are run on a computer, the computer is enabled to perform the methods according to the first aspect and the second aspect.

According to a sixth aspect, an embodiment of this application provides a computer program product including instructions. When the computer program product runs on a computer, the computer is enabled to perform the methods according to the first aspect and the second aspect.

According to a seventh aspect, an embodiment of this application provides a communication device. The communication device may include an entity such as a terminal device or a network device. The communication device includes a processor, and optionally, further includes a memory. The memory is configured to store instructions. The processor is configured to execute the instructions in the memory, so that the communication device performs the method according to any one of the first aspect and the second aspect.

According to an eighth aspect, an embodiment of this application provides a chip system. The chip system includes a processor, configured to support a communication device in implementing functions in the foregoing aspects, for example, sending or processing data and/or information in the foregoing methods. In a possible design, the chip system further includes a memory. The memory is configured to store program instructions and data that are necessary for the communication device. The chip system may include a chip, or may include the chip and another discrete component.

According to a ninth aspect, an embodiment of this application provides a communication device, including a processor and a communication interface. The communication interface is configured to: receive a signal from a communication device other than the communication device, and transmit the signal to the processor; or send a signal from the processor to a communication device other than the communication device. The processor is configured to implement the method according to any one of the first aspect and the second aspect by using a logic circuit or by executing code instructions.

DESCRIPTION OF EMBODIMENTS

Figure 1:
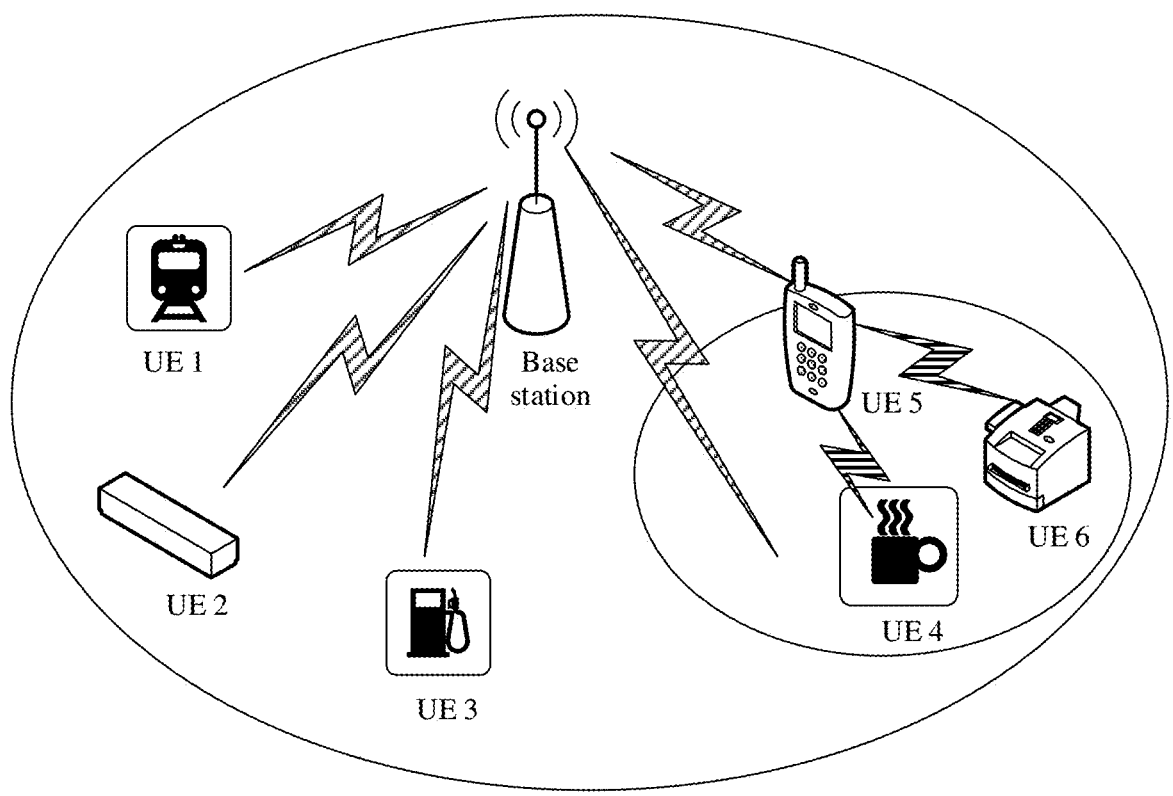
FIG. 1 is a schematic diagram of a structure of a radio access network according to an embodiment of this application.

Embodiments of this application provide a gap determining method and a device, so that a terminal device and a network device can determine a gap between transport blocks, to resolve a problem that the gap between the transport blocks cannot be determined currently.

The following describes embodiments of this application with reference to the accompanying drawings.

In the specification, claims, and the accompanying drawings of this application, the terms "first", "second", and the like are intended to distinguish similar objects but do not necessarily indicate a specific order or sequence. It should be understood that such terms are interchangeable in proper circumstances, and this is merely a distinguishing manner used to describe objects with a same attribute in embodiments of this application. In addition, the terms "include", "have" and any variant thereof mean to cover the non-exclusive inclusion, so that a process, method, system, product, or device that includes a series of units is not necessarily limited to those units, but may include other units not expressly listed or inherent to such a process, method, product, or device.

The technical solutions in embodiments of this application may be applied to various communication systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single-carrier frequency division multiple access (single carrier FDMA, SC-FDMA) system, and another system. Terms "system" and "network" are interchangeable. The CDMA system may implement wireless technologies such as universal terrestrial radio access (universal terrestrial radio access, UTRA) and CDMA2000. The UTRA may include a wideband CDMA (wideband CDMA, WCDMA) technology and another variant technology of CDMA. The CDMA2000 may cover the interim standard (interim standard, IS) 2000 (IS-2000), the IS-95, and the IS-856 standard. A wireless technology such as a global system for mobile communications (global system for mobile communication, GSM) may be implemented in the TDMA system. Wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA may be implemented in the OFDMA system. The UTRA and the E-UTRA correspond to UMTS and an evolved version of the UMTS. Long term evolution (long term evolution, LTE) and various versions evolved based on LTE in 3GPP are a new version of the UMTS that uses the E-UTRA. A 5th generation (5 Generation, "5G" for short) communication system, new radio (New Radio, "NR" for short), and a future 6th generation (6th generation, 6G) mobile communication system are next generation communication systems under study. The technical solutions in embodiments of this application may be applied to various communication systems such as V2X, LTE-V, V2V, an internet of vehicles, MTC, an IoT, LTE-M, M2M, and an internet of things. In addition, the communication systems may be further used in future-oriented communication technologies, and are all used in the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of a network architecture and emergence of a new service scenario, the technical solutions provided in embodiments of this application are also applicable to similar technical problems.

The communication system provided in embodiments of this application may include a first communication device and a second communication device, and data may be transmitted between the first communication device and the second communication device. For example, the first communication device may include a terminal device, and the second communication device may include a network device. Alternatively, the first communication device may include a terminal device, and the second communication device may include another terminal device. Alternatively, the first communication device may include a network device, and the second communication device may include another network device.

FIG. 1 is a schematic diagram of a structure of a possible radio access network (radio access network, RAN) according to an embodiment of this application. The RAN may be a base station access system in a 2G network (to be specific, the RAN includes a base station and a base station controller), may be a base station access system in a 3G network (to be specific, the RAN includes a base station and an RNC), may be a base station access system in a 4G network (to be specific, the RAN includes an eNB and an RNC), or may be a base station access system in a 5G network.

The RAN includes one or more network devices. The network device may be any device having a wireless transceiver function, or a chip disposed in the device having the wireless transceiver function. The network device includes but is not limited to a base station (for example, a base station BS, a NodeB, an evolved NodeB (eNodeB) or eNB, a gNodeB or a gNB in a 5th generation 5G communication system, a base station in a future communication system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support the network using the foregoing one or more technologies, or the future evolved network. The base station may include one or more co-site or non-co-site transmission reception points (transmission receiving point, TRP). The network device may alternatively be a radio controller, a centralized unit (centralized unit, CU), a distributed unit (distributed unit, DU), or the like in a cloud radio access network (cloud radio access network, CRAN) scenario. The network device may alternatively be a server, a wearable device, a vehicle-mounted device, or the like. An example in which the network device is the base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support dual connections to the base station in the LTE network and the base station in the 5G network. For example, the base station is a RAN node that connects a terminal to a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a base band unit (base band unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including the CU node and the DU node.

The terminal devices 1 to 6 each are also referred to as a user equipment (user equipment, UE), a mobile station (mobile station, MS), a mobile terminal (mobile terminal, MT), a terminal, or the like, and each are a device that provides voice and/or data connectivity for a user or a chip disposed in the device, for example, a handheld device or a vehicle-mounted device having a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home). The terminal device provided in embodiments of this application may be a low-complexity terminal device and/or a terminal device in a coverage enhancement mode A. For example, a terminal device provided in embodiments of this application may be a terminal device that supports multi-transport block scheduling, and the other terminal device may be a terminal device that does not support multi-transport block scheduling. Not support multi-transport block scheduling means using single transport block scheduling.

In this embodiment of this application, a communication system includes the base station and the UE 1 to the UE 6. In the communication system, the base station sends one or more of system information, a RAR message, and a paging message to one or more of the UE 1 to the UE 6. In addition, a communication system alternatively includes the UE 4 to the UE 6. In the communication system, the UE 5 may function as a base station, and the UE 5 may send one or more of system information, control information, and a paging message to one or more of the UE 4 and the UE 6.

In this application, transmission may be sending or receiving. When one side of communication performs sending, a peer device of the communication performs receiving. A TB may be a TB in uplink transmission, or may be a TB in downlink transmission.

Figure 2A:
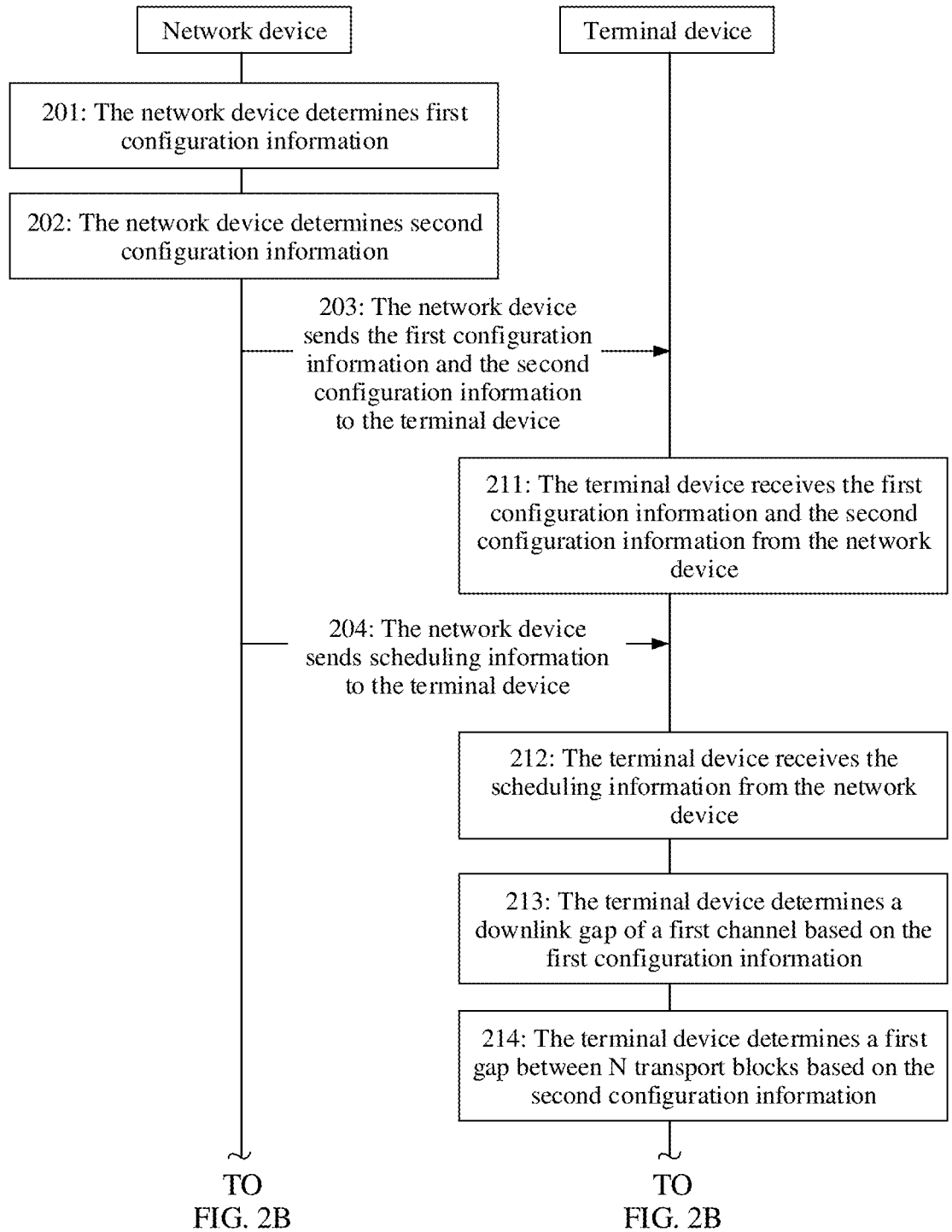
FIG. 2A and FIG. 2B are a schematic diagram of an interaction procedure of a gap determining method according to an embodiment of this application.
Figure 2B:
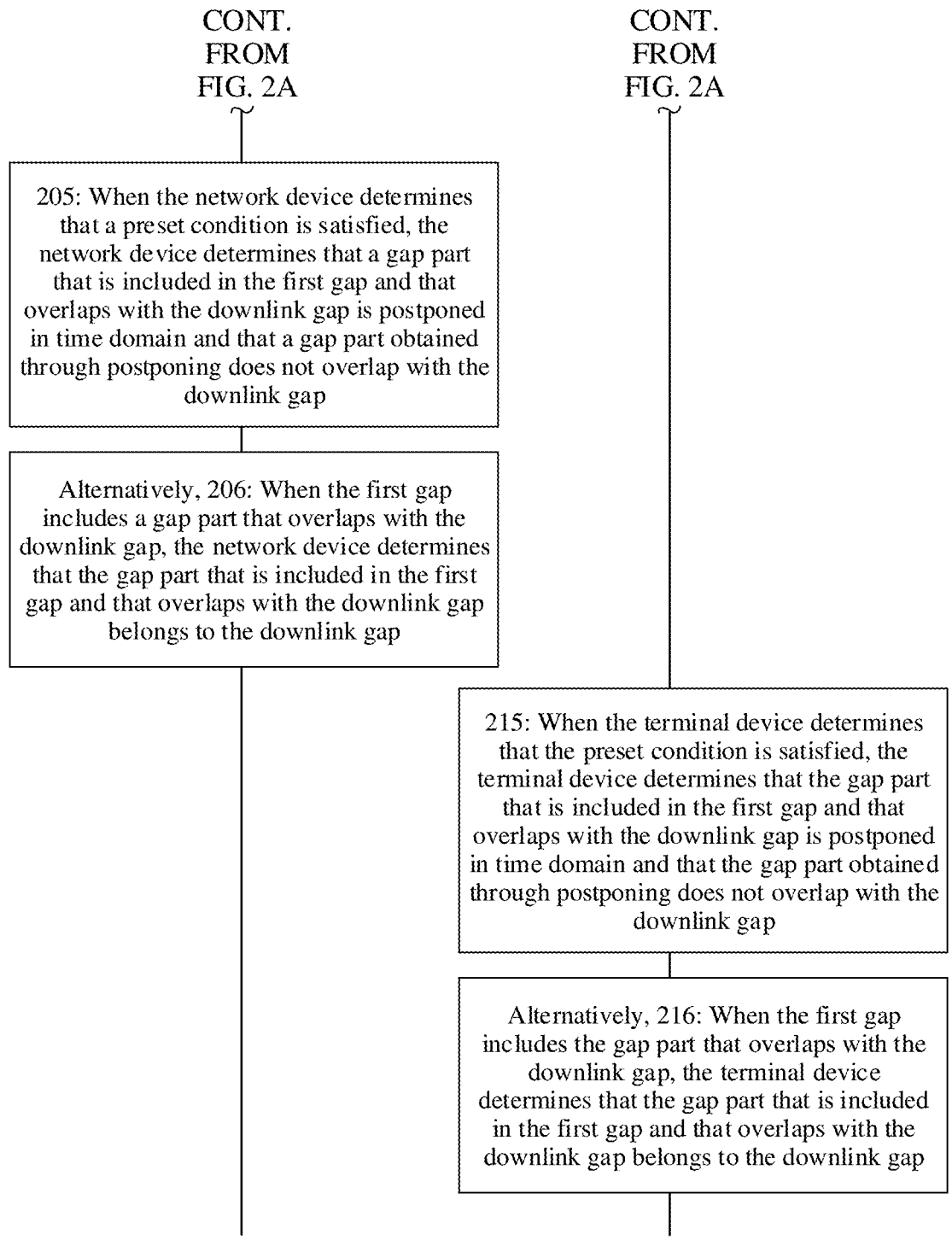

FIG. 2A and FIG. 2B are a schematic diagram of an interaction procedure of a gap determining method according to an embodiment of this application. The following step 201 to step 206 are described from a perspective of a network device, and the following step 211 to step 216 are described from a perspective of a terminal device. The following steps are mainly included.

201: The network device determines first configuration information, where the first configuration information is used to indicate a gap of a first channel, the first channel carries N transport blocks, and N is a positive integer.

The network device may transmit the N transport blocks to the terminal device through the first channel. For example, the first channel may be a narrowband physical downlink shared channel (narrowband physical downlink shared channel, NPDSCH). For example, a logical channel corresponding to the NPDSCH may be a single-cell multicast traffic channel (single cell-multicast traffic channel, SC-MTCH). Alternatively, the first channel may be another downlink data channel. This is not limited herein.

In this embodiment of this application, the first channel carries the N transport blocks. N has a plurality of values. For example, N may be equal to 1. That is, one first channel may carry one transport block. For another example, a value of N may be greater than or equal to 2. That is, one first channel may carry a plurality of transport blocks. A quantity of transport blocks carried on the first channel may be specifically configured based on an application scenario.

Figure 3:
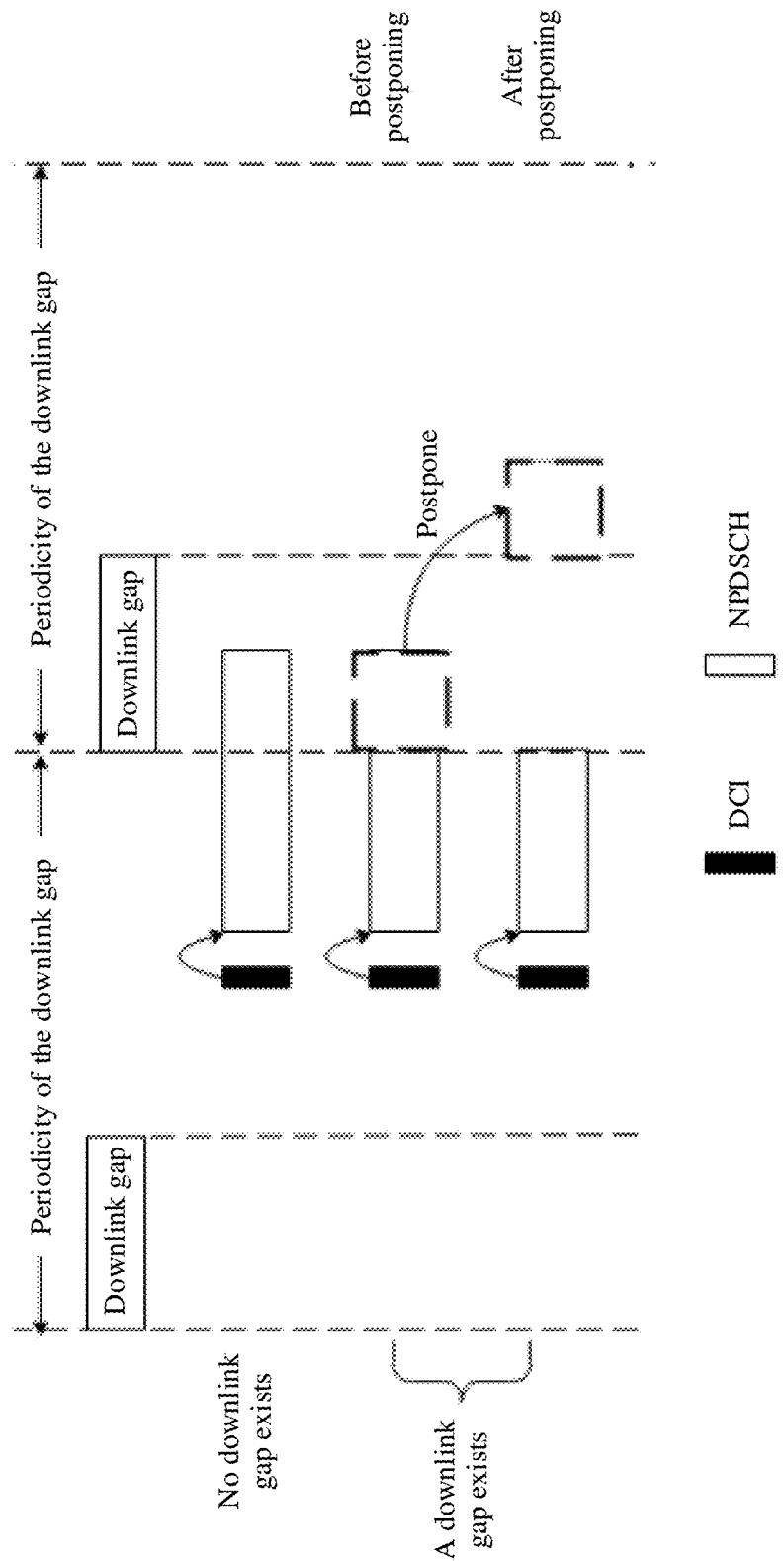
FIG. 3 is a schematic diagram of determining whether a downlink gap is introduced according to an embodiment of this application.

In this embodiment of this application, the network device may generate the first configuration information, where the first configuration information is used to indicate the gap of the first channel A downlink gap (DL gap) may be introduced into the first channel, and the network device may determine whether the downlink gap is introduced into transmission of the current first channel. For example, the first configuration information may be configuration information of the DL gap. FIG. 3 is a schematic diagram of determining whether the downlink gap is introduced according to this embodiment of this application. For example, the DL gap may be introduced into an NB-IoT. A manner of determining whether the DL gap exists includes: comparing a maximum quantity $R_{max}$ of repetitions of narrowband physical downlink control channel (narrowband physical downlink control channel, NPDCCH) search space with a threshold $N_{gap,\ threshold}$ configured by the network device. If $R_{max} < N_{gap,\ threshold}$, no DL gap exists on the NPDCCH or the NPDSCH. If $R_{max} \geq N_{gap,\ threshold}$, the DL gap exists on the NPDCCH, the DL gap exists on the NPDSCH, and transmission of the NPDCCH and the NPDSCH needs to be postponed (postpone) when encountering the DL gap. In FIG. 3, downlink control information (downlink control information, DCI) is used to schedule the NPDSCH. When the NPDSCH overlaps with the DL gap, a part that is of the NPDSCH and that overlaps with the DL gap needs to be postponed to a time domain position that does not overlap with the DL gap.

The DL gap appears periodically, and the network device configures a periodicity $N_{gap,\ period}$ of the DL gap and a coefficient $N_{gap,\ coff}$ for calculating duration of the DL gap. A starting frame and a starting subframe of the DL gap in each periodicity are determined according to the following formula:

$$(10n_f + \lfloor n_s/2 \rfloor) \bmod N_{gap,period} = 0.$$

$n_f$ is a radio frame number, and $n_s$ is a subframe number. The duration of the DL gap satisfies the following relationship:

$$N_{gap,duration} = N_{gap,coff} N_{gap,period}.$$

202: The network device determines second configuration information, where the second configuration information is used to indicate a first gap between the N transport blocks.

For the N transport blocks carried on the first channel, a gap may also be introduced between the transport blocks. The gap may be a gap between the transport blocks. In this embodiment of this application, the gap between the transport blocks is referred to as the "first gap". For example, the first gap may be a scheduling gap (scheduling gap). Alternatively, the first gap may be a TB gap.

There are a plurality of implementations of the first gap, and the implementations are described below in detail.

In a possible implementation, the first gap is a gap after each transport block in the N transport blocks. For example, the first gap is a gap after any transport block in the N transport blocks. For example, the first gap may be a gap after the last transport block in the N transport blocks. That is, the first gap exists after the last transport block in the N transport blocks. Alternatively, the first gap may not include a gap after the last transport block in the N transport blocks. That is, there is no first gap after the last transport block in the N transport blocks.

Figure 4:
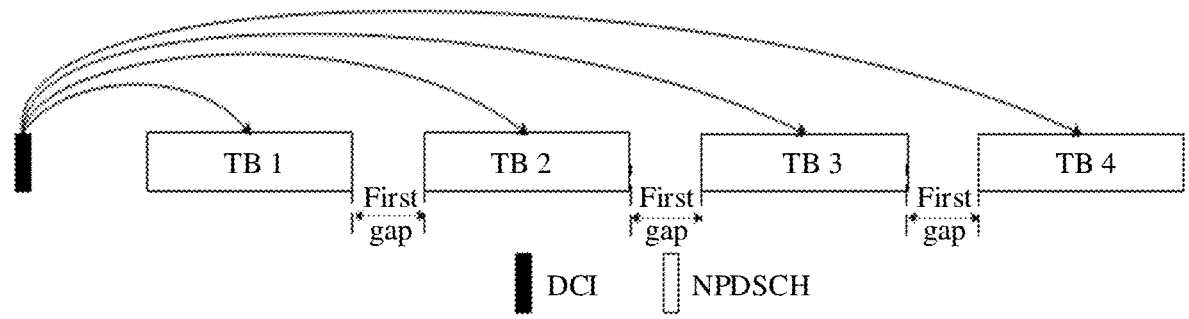
FIG. 4 is a schematic diagram of first gaps between transport blocks according to an embodiment of this application.

For example, in an NB-IoT scenario, for the SC-MTCH, a maximum quantity of TBs scheduled by using one piece of DCI is 8. One first gap is inserted after each TB. For example, the first gap may be the scheduling gap (scheduling gap). FIG. 4 is a schematic diagram of first gaps between transport blocks according to this embodiment of this application. For example, one piece of DCI is used to schedule four transport blocks: a TB 1, a TB 2, a TB 3, and a TB 4. A specific value of the first gap is configured by the network device by using an RRC message. Specifically, the value of the first gap may be {0, 16, 32, 64, 128} subframes, where duration corresponding to each subframe is 1 millisecond (ms).

In a possible implementation, the first gap is a gap after every two transport blocks in the N transport blocks. For example, the first gap is a gap after two adjacent transport blocks in the N transport blocks. For example, the first gap may be a gap after the last two transport blocks in the N transport blocks. That is, the first gap exists after the last two transport blocks in the N transport blocks. Alternatively, the first gap may not include a gap after the last two transport blocks in the N transport blocks. That is, there is no first gap after the last two transport blocks in the N transport blocks.

Figure 5:
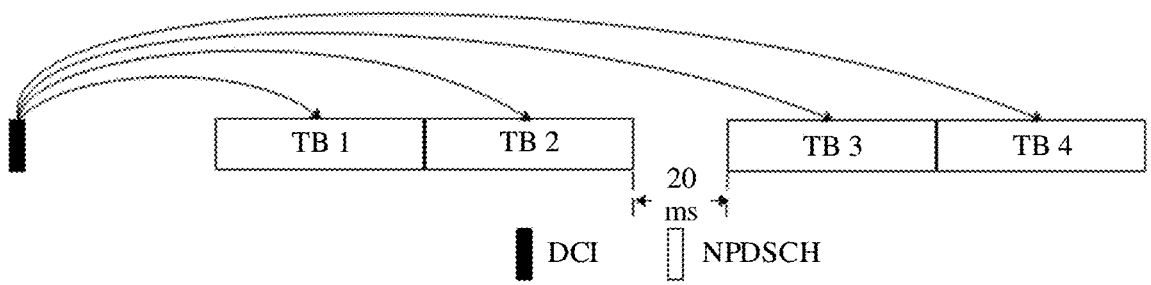
FIG. 5 is another schematic diagram of a first gap between transport blocks according to an embodiment of this application.

FIG. 5 is another schematic diagram of a first gap between transport blocks according to this embodiment of this application. For example, one piece of DCI is used to schedule four transport blocks: a TB 1, a TB 2, a TB 3, and a TB 4. When a configured value of a gap after each TB in the four TBs is 0, and a quantity of subframes occupied by an NPDSCH that carries each transport block is less than 12, one fixed first gap of 20 ms is inserted after every two transport blocks. The first gap of 20 ms is inserted after the TB 1 and the TB 2. That is, there is no gap between the TB 1 and the TB 2, the first gap of 20 ms is inserted between the TB 2 and the TB 3, and there is no gap between the TB 3 and the TB 4.

It should be noted that there is no execution sequence of step 201 and step 202. Step 201 may be performed before step 202, step 202 may be performed before step 201, or step 201 and step 202 may be simultaneously performed. This is not limited herein.

203: The network device sends the first configuration information and the second configuration information to the terminal device.

In this embodiment of this application, after the network device generates the first configuration information and the second configuration information, the network device may send the first configuration information and the second configuration information to the terminal device. A transmission path is established between the network device and the terminal device. For example, the network device sends the first configuration information and the second configuration information to the terminal device through a wireless network or a wired network.

It should be noted that the network device may send the first configuration information and the second configuration information to the terminal device by using one message, for example, a radio resource control (radio resource control, RRC) message. Alternatively, the network device may separately send the first configuration information and the second configuration information, that is, may separately send the first configuration information and the second configuration information to the terminal device by using two messages. This is not limited herein.

211: The terminal device receives the first configuration information and the second configuration information from the network device, where the first configuration information is used to indicate a gap of a transport channel, and the second configuration information is used to indicate the gap between the transport blocks.

In this embodiment of this application, the transmission path is established between the network device and the terminal device. For example, the network device sends the first configuration information and the second configuration information to the terminal device through the wireless network or the wired network. The terminal device may receive the first configuration information and the second configuration information.

204: The network device sends scheduling information to the terminal device, where the scheduling information is used to schedule the N transport blocks.

In this embodiment of this application, after step 201 to step 203 are performed, the network device sends the scheduling information to the terminal device, where the scheduling information may be used to schedule the N transport blocks. It can be learned from the foregoing descriptions that the N transport blocks are carried on the first channel. When the first gap between the N transport blocks and the downlink gap of the first channel appear simultaneously, the network device may perform either of the following step 205 and step 206 below, so that the network device can determine the first gap, to resolve a problem that the first gap cannot be determined currently.

The scheduling information sent by the network device to the terminal device may be DCI, or may be other downlink control signaling. This is not limited herein. For example, a base station sends DCI to a UE, where the DCI is used to schedule N TBs, and the base station determines that the DL gap is applied to transmission of an NPDSCH that carries the N TBs. It should be understood that Rmax in configuration information that is of the DL gap and that is sent by the base station satisfies $R_{max} \geq N_{gap,\ threshold}$. Accordingly, the UE receives the DCI and the N TBs scheduled by using the DCI. The UE determines, based on the configuration information of the DL gap, that the DL gap is applied to the transmission of the NPDSCH that carries the N TBs. That is, the UE determines $R_{max} \geq N_{gap,\ threshold}$.

212: The terminal device receives the scheduling information from the network device, where the scheduling information is used to schedule the N transport blocks carried on the first channel, and N is a positive integer.

In this embodiment of this application, the network device sends the scheduling information to the terminal device, where the scheduling information may be used to schedule the N transport blocks. It can be learned from the foregoing descriptions that the N transport blocks are carried on the first channel. When the first gap between the N transport blocks and the downlink gap of the first channel appear simultaneously, the terminal device may perform either of the following step 215 and step 216, so that the terminal device can determine the first gap, to resolve the problem that the first gap cannot be determined currently.

213: The terminal device determines the downlink gap of the first channel based on the first configuration information.

The terminal device parses the first configuration information, to determine the gap that is of the transmission channel and that is indicated by using the first configuration information. The first configuration information is used to indicate the gap of the first channel. The downlink gap (DL gap) may be introduced into the first channel, and the network device may determine whether the downlink gap is introduced into the transmission of the current first channel. For example, the first configuration information may be the configuration information of the DL gap.

214: The terminal device determines the first gap between the N transport blocks based on the second configuration information.

The terminal device parses the second configuration information, to determine the gap that is between the transport blocks and that is indicated by using the second configuration information. For the N transport blocks carried on the first channel, the gap may also be introduced between the transport blocks. The gap may be the gap between the transport blocks. In this embodiment of this application, the gap between the transport blocks is referred to as the "first gap". For example, the first gap may be the scheduling gap (scheduling gap). Alternatively, the first gap may be the TB gap.

For example, the first gap has two meanings. A first meaning of the first gap is the gap inserted after each TB in the N transport blocks. For example, the first gap is a configurable scheduling gap. In this case, the first gap may be used to resolve a backward compatibility problem of a plurality of types of UEs. A second meaning of the first gap is the gap inserted after the every two TBs in the N transport blocks, and is a fixed gap of 20 ms. In this case, the first gap may be used to ensure that a processing capability of the terminal device is equivalent to that in a case in which scheduling of a plurality of TBs by using one piece of DCI is not supported, and processing complexity of the terminal device is not significantly improved. In addition, compared with a case in which the gap has the first meaning, this can improve data transmission efficiency.

205: When the network device determines that a preset condition is satisfied, the network device determines that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap.

In this embodiment of this application, when the first gap includes the gap part that overlaps with the downlink gap, the network device determines that the gap part that is included in the first gap and that overlaps with the downlink gap is postponed in time domain and that the gap part obtained through postponing does not overlap with the downlink gap. In addition, the network device may further perform a process of determining whether the preset condition is satisfied. This is not limited. When the network device determines that the preset condition is satisfied, the network device determines that the gap part that is included in the first gap and that overlaps with the downlink gap is postponed in time domain and that the gap part obtained through postponing does not overlap with the downlink gap. When the network device determines that the preset condition is not satisfied, the network device does not perform step 205.

Figure 6:
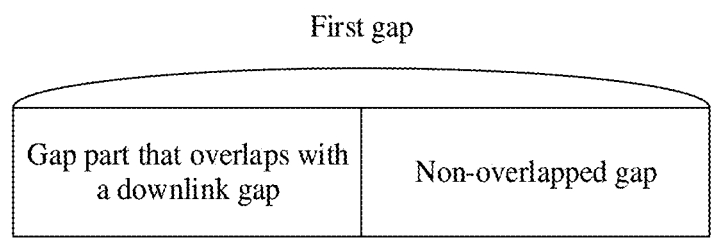
FIG. 6 is a schematic diagram of composition parts of a first gap according to an embodiment of this application.

In this embodiment of this application, the first gap is the gap between the N transport blocks, and the downlink gap is the gap of the first channel. In this case, the first gap may overlap with the downlink gap. In this embodiment of this application, a gap that is included in the first gap and that overlaps with the downlink gap is referred to as the "gap part". The gap part is a sub-gap that is in the first gap and that overlaps with the downlink gap. For example, the first gap may completely overlap with the downlink gap. That is, all gap parts of the first gap overlap with the downlink gap. FIG. 6 is a schematic diagram of composition parts of the first gap according to this embodiment of this application. Only a part of the first gap overlaps with the downlink gap. In this case, the first gap may include two parts: the gap part that overlaps with the downlink gap and a non-overlapped gap. The postponing in step 205 is postponing, in time domain, the gap part that is included in the first gap and that overlaps with the downlink gap, and that the gap part obtained through postponing does not overlap with the downlink gap needs to remain.

In this embodiment of this application, the gap part that is included in the first gap and that overlaps with the downlink gap needs to be postponed in time domain, and the gap part obtained through postponing does not overlap with the downlink gap. The postponing means postponing, in time domain, the gap part that is included in the first gap and that overlaps with the downlink gap to a time domain position that does not overlap with the downlink gap. For example, in step 212, the terminal device supports multi-transport block scheduling, and the scheduling information received by the terminal device may be used to schedule a plurality of transport blocks. After the gap part that is included in the first gap and that overlaps with the downlink gap is postponed, the gap part that is included in the first gap and that overlaps with the downlink gap may be used by the network device to send another piece of scheduling information. The another piece of scheduling information may be used to schedule a transport block for a terminal device that supports single transport block scheduling. When the transport block is transmitted after the first gap, repeat transmission of a same transport block can be avoided, and network resource overheads can be reduced.

For example, the first gap is the scheduling gap. The first gap is used as a part of the transmission of the NPDSCH that carries the N TBs. When the DL gap overlaps with the first gap, the overlapped part in the first gap is postponed (postpone). For example, it is assumed that the N TBs each are denoted as a TB i in a time sequence, where i satisfies the following condition: i=0, 1, 2, . . . , and N−1. An ending subframe of the transmission of the NPDSCH that carries the TB i is denoted as ni, and a starting subframe of transmission of an NPDSCH that carries a TB j is denoted as nj, where j satisfies: j=i+1, i+2, . . . , and N−1. A quantity of subframes occupied by the downlink gap (DL gap) is k, and a quantity of subframes occupied by the first gap is m. According to this embodiment, m and k satisfy the following relationship: m=nj−ni−k−2.

Figure 7:
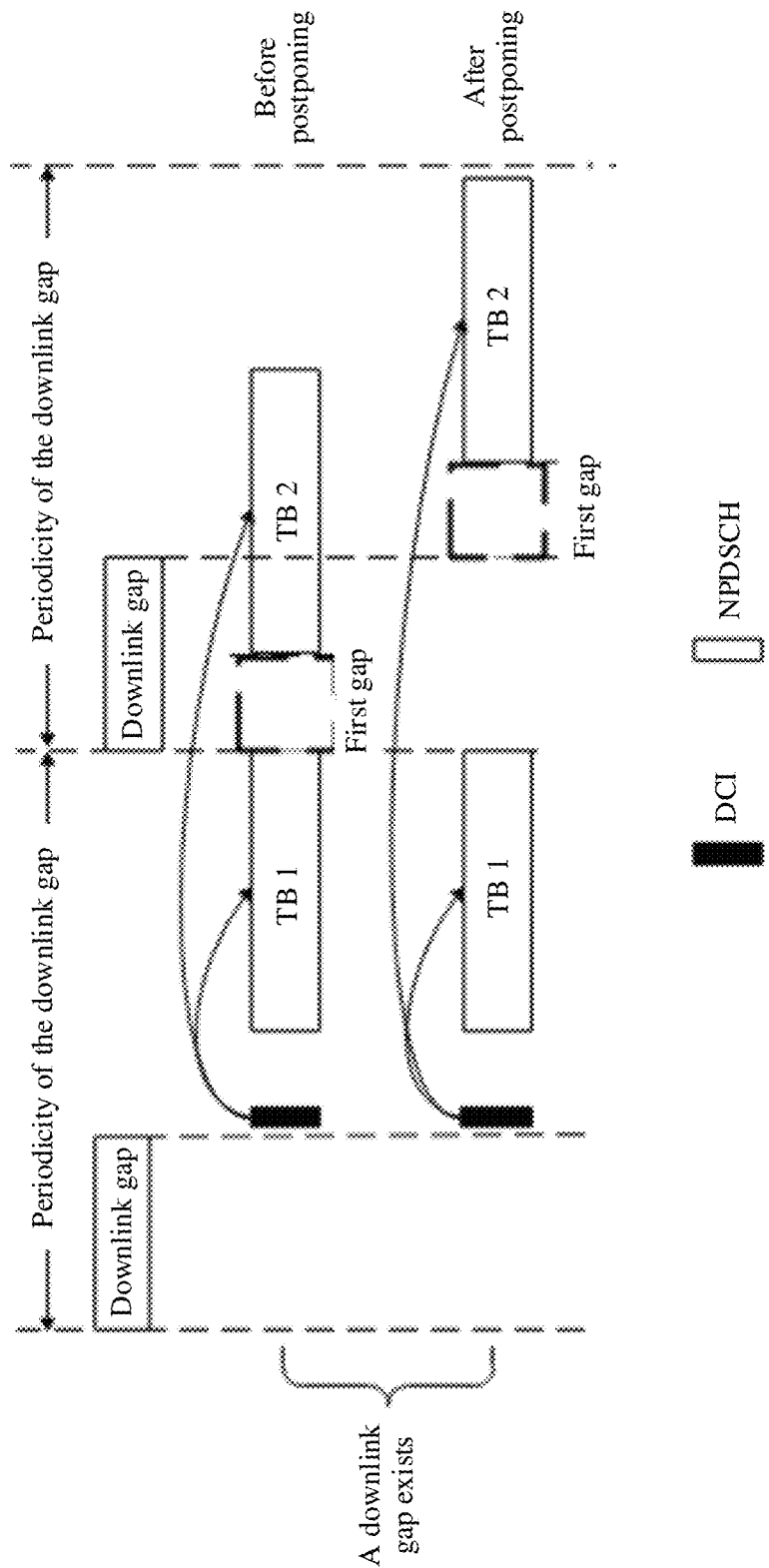
FIG. 7 is a schematic diagram of an application scenario in which a gap part that is in a first gap and that overlaps with a downlink gap is postponed in time domain according to an embodiment of this application.

FIG. 7 is a schematic diagram of an application scenario in which the gap part that is in the first gap and that overlaps with the downlink gap is postponed in time domain according to this embodiment of this application. The UE supports multi-transport block scheduling. One piece of DCI is used to schedule both a TB 1 and a TB 2. Before the postponing, the first gap overlaps with the downlink gap. According to this embodiment of this application, the gap part that is in the first gap and that overlaps with the downlink gap is postponed in time domain, and the gap part obtained through postponing does not overlap with the downlink gap. For example, duration of the first gap is less than duration of the DL gap. In this case, the entire first gap completely overlaps (overlap) with the DL gap. Therefore, the entire first gap needs to be postponed (postpone). That is, the entire first gap shown in FIG. 7 is postponed.

Figure 8:
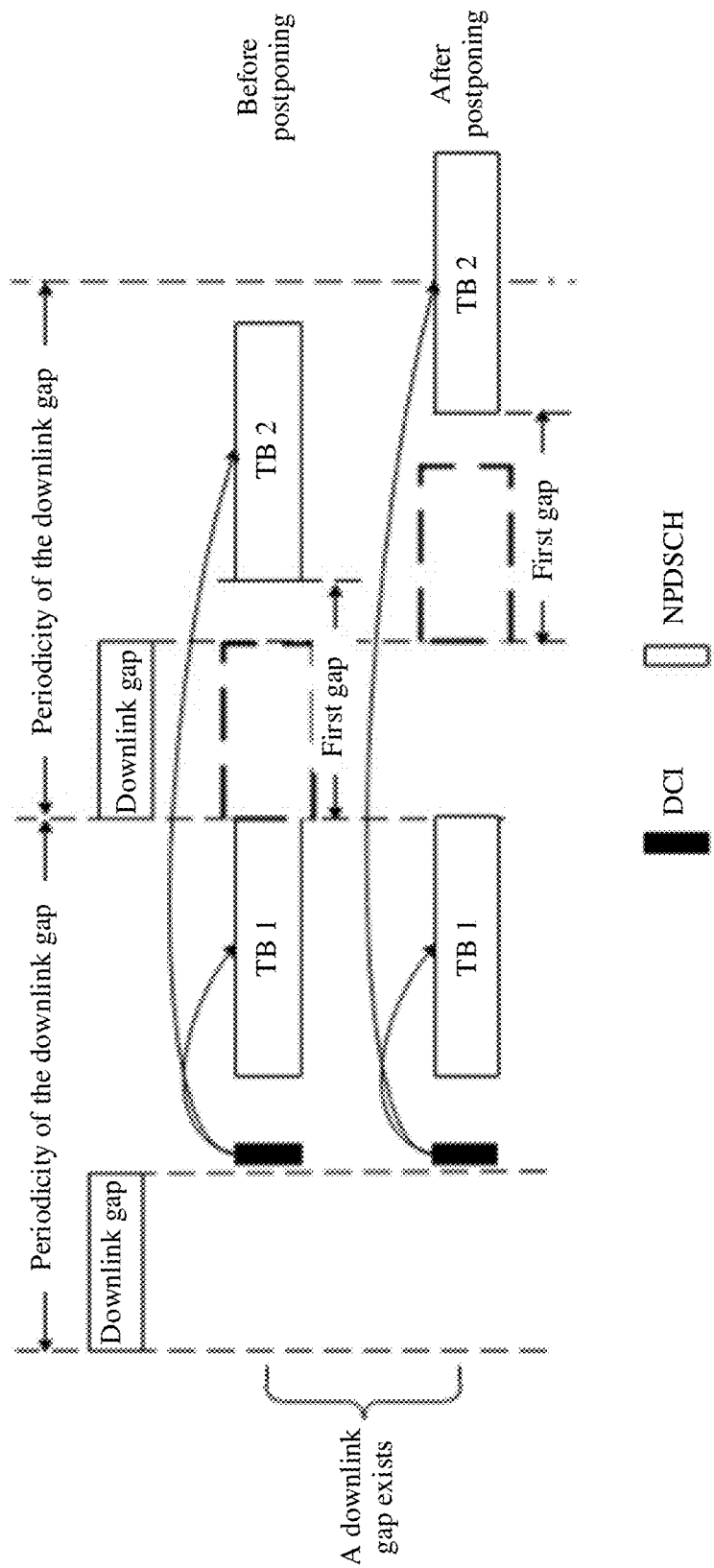
FIG. 8 is a schematic diagram of another application scenario in which a gap part that is in a first gap and that overlaps with a downlink gap is postponed in time domain according to an embodiment of this application.

FIG. 8 is a schematic diagram of another application scenario in which the gap part that is in the first gap and that overlaps with the downlink gap is postponed in time domain according to this embodiment of this application. Duration of the first gap is greater than duration of the DL gap. In this case, a part of the first gap overlaps with the DL gap. Therefore, the overlapped gap part in the first gap needs to be postponed (postpone). That is, the gap part that is in the first gap and that overlaps with the DL gap shown in FIG. 8 needs to be postponed.

Figure 9:
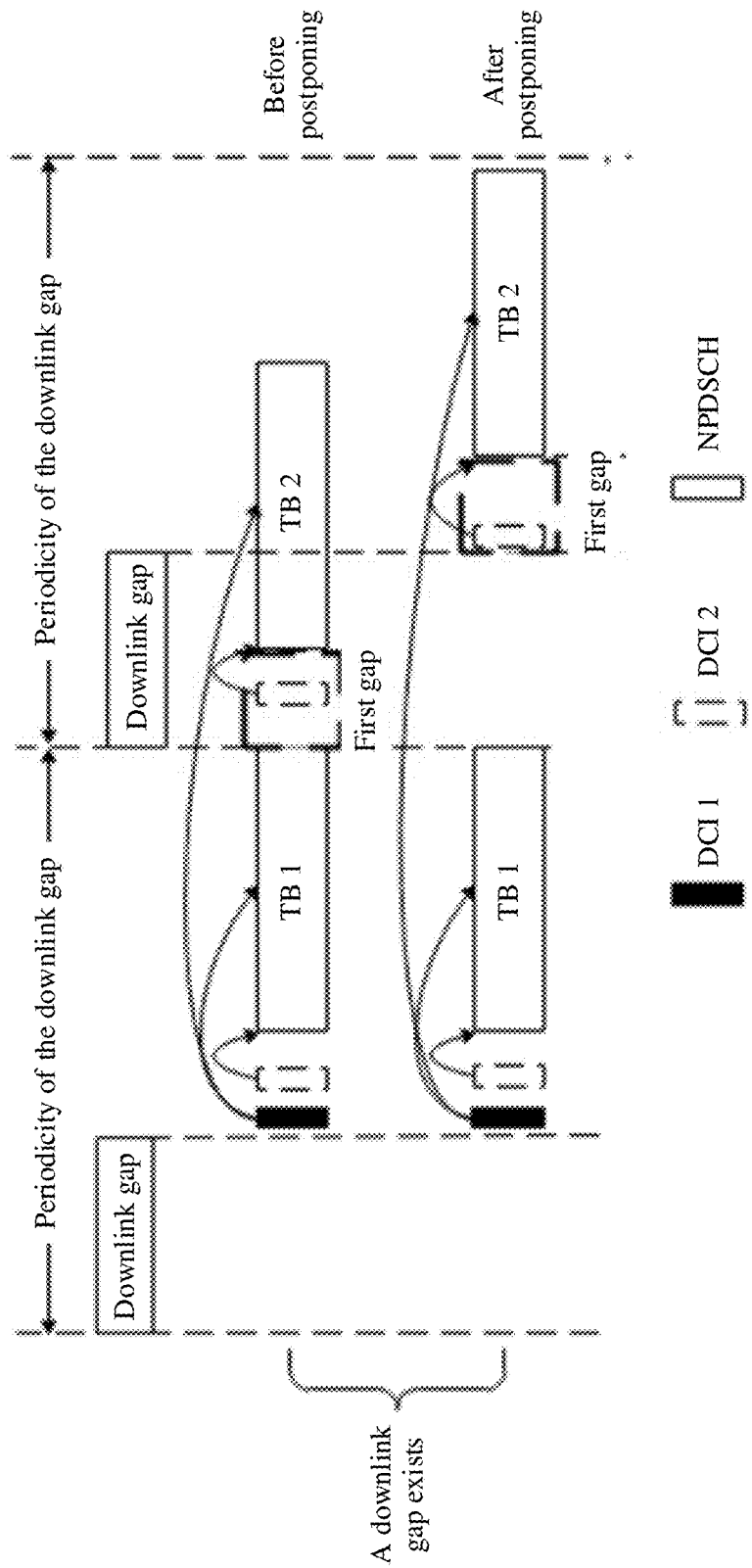
FIG. 9 is a schematic diagram of another application scenario in which a gap part that is in a first gap and that overlaps with a downlink gap is postponed in time domain according to an embodiment of this application.

FIG. 9 is a schematic diagram of another application scenario in which the gap part that is in the first gap and that overlaps with the downlink gap is postponed in time domain according to this embodiment of this application. Technical effects achieved in this embodiment of this application are described below by using an example. There are two UE types in FIG. 9. A first UE type is a UE that supports multi-TB scheduling, and is denoted as a first-type UE. The first-type UE receives DCI 1. The first-type UE receives one piece of DCI 1, where the DCI may be used to schedule a TB 1 and a TB 2. A second UE type is a UE that does not support multi-TB scheduling, and is denoted as a second-type UE. The second-type UE receives DCI 2. The second-type UE needs to receive two pieces of DCI 2, where the first piece of DCI 2 is used to schedule the TB 1, and the second piece of DCI 2 is used to schedule the TB 2. For both of the two types of UEs, the DL gap is applied to downlink transmission. The two types of UEs receive a same configuration of the DL gap. According to this embodiment, when the first gap overlaps with the DL gap, the gap part that is in the first gap and that overlaps with the downlink gap is postponed in time domain, to ensure that the second-type UE can monitor and obtain, in a first gap obtained through postponing, the DCI 2 for scheduling the TB 2. In this way, for a same SC-MTCH, the network device needs to send the TB 2 only once, to reduce network resource overheads.

Figure 10:
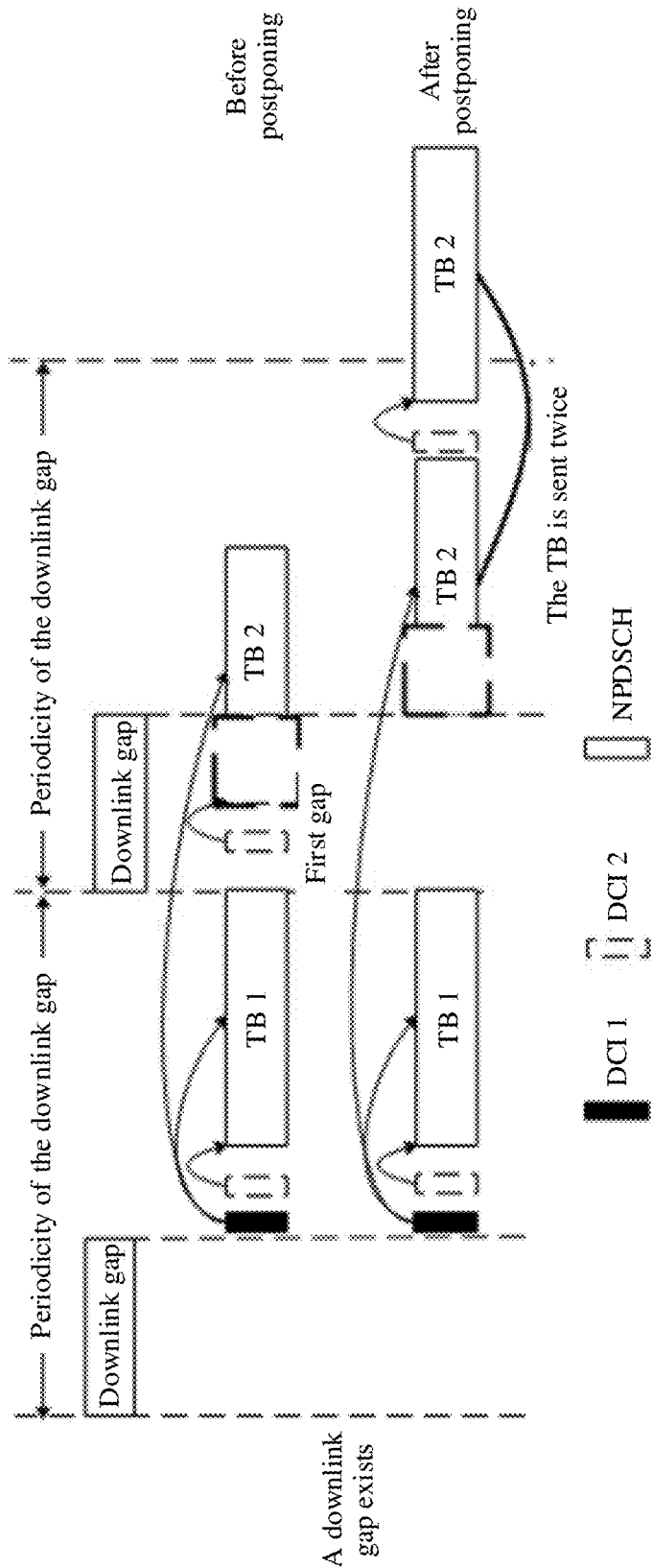
FIG. 10 is a schematic diagram of an application scenario in which a gap part that is in a first gap and that overlaps with a downlink gap is not postponed in time domain according to an embodiment of this application.

FIG. 10 is a schematic diagram of an application scenario in which the gap part that is in the first gap and that overlaps with the downlink gap is not postponed in time domain according to this embodiment of this application. The following continues to use the foregoing example to describe a problem caused when the solution in this embodiment is not used. As shown in FIG. 10, only a part that is of the TB 2 and that overlaps with the DL gap is postponed. If the first gap is not postponed (postpone), for the second-type UE, the DCI 2 for scheduling the TB 2 also needs to be postponed. In this case, the network device cannot send the TB 2 only once for the first-type UE and the second-type UE. The network device needs to send the TB 2 once for the first-type UE, and send the same TB 2 once again for the second-type UE. This causes a waste of resources, and reduces network resource utilization.

The network device determines whether the preset condition is satisfied, where the preset condition is used to determine whether to perform the following step: The network device determines that the gap part that is included in the first gap and that overlaps with the downlink gap is postponed in time domain and that the gap part obtained through postponing does not overlap with the downlink gap. There are a plurality of implementations of the preset condition determined by the network device. For example, the preset condition may be a preset condition set for the N transport blocks, may be a preset condition set for the first gap, or may be a preset condition set for the N transport blocks and the first gap. The implementations of the preset condition are not limited.

In this embodiment of this application, the preset condition may further include any one of the following five conditions. The first gap is used as the part of the transmission of the NPDSCH that carries the N TBs. When the DL gap overlaps with the first gap, the overlapped gap part in the first gap is postponed. The following separately describes the foregoing five preset conditions by using examples.

The preset condition further includes at least one of the following:

(1) The value of N is greater than or equal to a first threshold, where the first threshold includes one of the following values: 2, 3, 4, 5, 6, 7, or 8.

For example, when the quantity of TBs scheduled by using the DCI is greater than or equal to the first threshold, the first threshold may be an agreed value or a value configured by the network device. The first threshold may be 2, 3, 4, 5, 6, 7, or 8.

Figure 11:
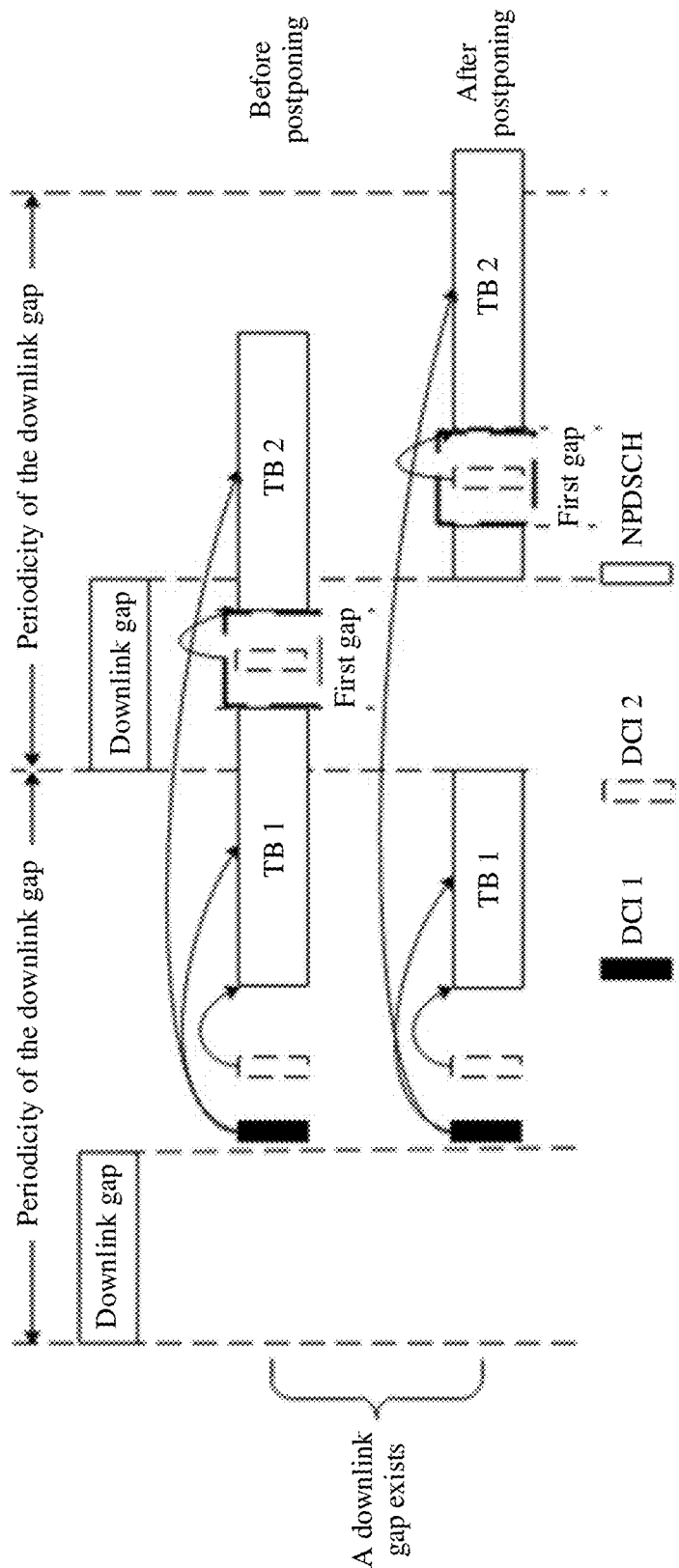
FIG. 11 is a schematic diagram of another application scenario in which a gap part that is in a first gap and that overlaps with a downlink gap is postponed in time domain according to an embodiment of this application.

When the quantity of TBs scheduled by using the DCI is small, for example, when the quantity of TBs is 1, the network device may adjust a position of the first gap through scheduling, so that the network device has space to send the DCI to the second-type UE, to schedule the TB 2. FIG. 11 is a schematic diagram of another application scenario in which the gap part that is in the first gap and that overlaps with the downlink gap is postponed in time domain according to this embodiment of this application. Transmission of a part of a TB 1 is postponed because the part of the TB 1 encounters the DL gap. In this way, the first gap does not overlap with the DL gap. The first gap does not completely overlap with the DL gap. In this case, in a non-overlapped part of the first gap, the base station may send DCI to a second-type UE, to schedule a TB 2. In this case, the part that is of the first gap and that overlaps with the DL gap may not need to be postponed.

Figure 12:
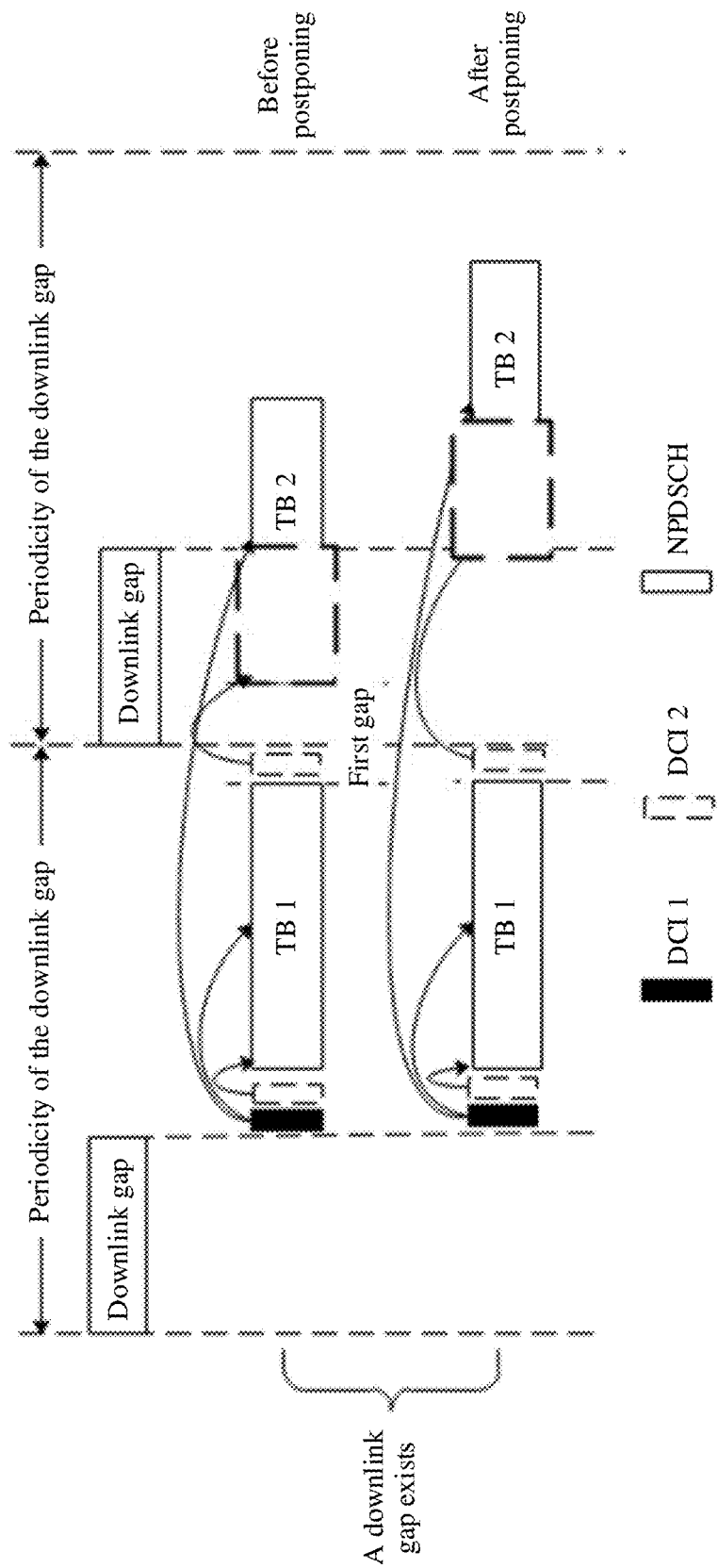
FIG. 12 is a schematic diagram of another application scenario in which a gap part that is in a first gap and that overlaps with a downlink gap is postponed in time domain according to an embodiment of this application.

FIG. 12 is a schematic diagram of another application scenario in which the gap part that is in the first gap and that overlaps with the downlink gap is postponed in time domain according to this embodiment of this application. For example, the quantity of TBs scheduled by using the DCI is 2. When the quantity of TBs scheduled by using the piece of DCI is greater than 2, for example, the network device may just adjust a location of the first gap through scheduling, so that the network device has space to schedule a subsequent TB for a second-type UE in a manner in which one TB is scheduled by using one piece of DCI and it is ensured that a first-type UE schedules TBs in a manner in which a plurality of TBs are scheduled by using the piece of DCI. Finally, resource positions of scheduled TBs are the same. This solution cannot be implemented. Therefore, the solution in this embodiment needs to be used when the quantity of TBs scheduled by using the DCI is greater than the first threshold. That is, when the first gap overlaps with the DL gap, the overlapped gap part in the first gap is postponed.

(2) Duration of the first gap is greater than or equal to a second threshold, where the second threshold is a preset value, or the second threshold is a value notified by the network device to the terminal device.

Figure 13:
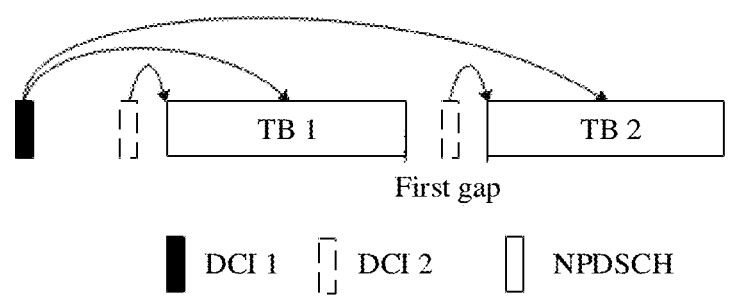
FIG. 13 is a schematic diagram of an application scenario of multi-transport block scheduling and single transport block scheduling according to an embodiment of this application.

For example, when the duration of the first gap is greater than or equal to the second threshold, the second threshold may be an agreed value or configured by the network device. FIG. 13 is a schematic diagram of an application scenario of multi-transport block scheduling and single transport block scheduling according to this embodiment of this application. For example, one piece of DCI 1 is used to schedule a TB 1 and a TB 2, and one piece of DCI 2 is used to schedule one TB. To be specific, one piece of DCI 2 is used to schedule the TB 1, and the other piece of DCI 2 is used to schedule the TB 2. The first gap is introduced between the TB 1 and the TB 2, so that one piece of DCI 2 can be sent in the first gap, where the DCI 2 may be used to schedule the TB 2. The first gap can be used to send the piece of DCI 2 only when the duration of the first gap is large enough. Therefore, the duration of the first gap is greater than or equal to the second threshold, so that repeat sending of a same SC-MTCH TB can be avoided, and network resource overheads can be reduced.

(3) Duration of the first gap is less than or equal to duration of the downlink gap.

Figure 14:
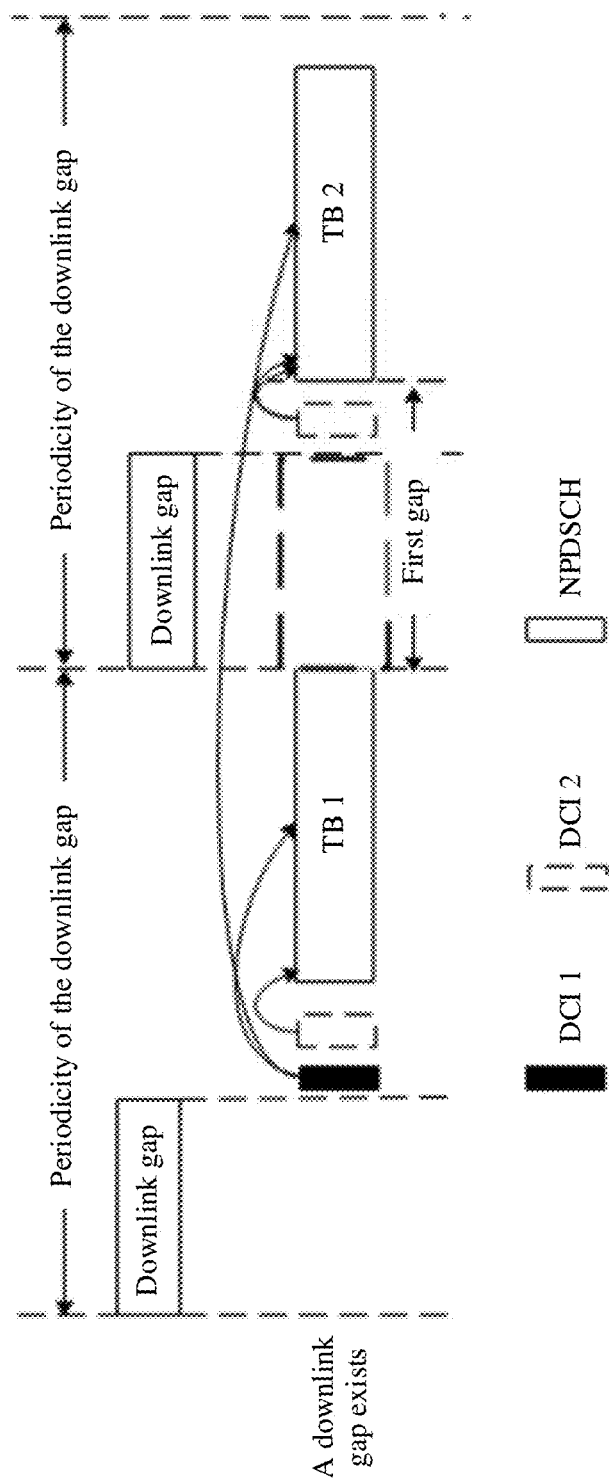
FIG. 14 is a schematic diagram of another application scenario in which a gap part that is in a first gap and that overlaps with a downlink gap is postponed in time domain according to an embodiment of this application.

For example, the duration of the first gap is less than or equal to the duration of the DL gap. FIG. 14 is a schematic diagram of another application scenario in which the gap part that is in the first gap and that overlaps with the downlink gap is postponed in time domain according to this embodiment of this application. The duration of the first gap is greater than the duration of the DL gap. In this case, the first gap does not completely overlap with the DL gap. In this case, in a non-overlapped part of the first gap, the base station may send DCI to a second-type UE, to schedule a TB 2. In this case, the part that is of the first gap and that overlaps with the DL gap may not need to be postponed. Therefore, when the duration of the first gap is less than or equal to the duration of the DL gap, the gap part that is in the first gap and that overlaps with the DL gap further needs to be postponed, so that repeat sending of a same SC-MTCH TB can be avoided, and network resource overheads can be reduced.

(4) Starting positions of the first gap and the downlink gap are the same.

For example, that the starting positions of the first gap and the downlink gap are the same may be that starting subframes of the first gap and the downlink gap are the same. When the starting subframe of the first gap is the same as the starting subframe of the DL gap, the gap part that is in the first gap and that overlaps with the DL gap further needs to be postponed, so that repeat sending of a same SC-MTCH TB can be avoided, and network resource overheads can be reduced.

(5) The N transport blocks are scheduled in a first manner and a second manner, where the first manner is multi-transport block scheduling, and the second manner is not multi-transport block scheduling. Multi-transport block scheduling may be understood as a manner in which a plurality of TBs may be scheduled by using one piece of DCI. Not multi-transport block scheduling may be understood as a manner in which the plurality of TBs may not be scheduled by using the piece of DCI or a manner in which one TB is scheduled by using the piece of DCI.

For example, when a group radio network temporary identifier (group radio network temporary identifier, G-RNTI) associated with the NPDSCH is configured in both a first SC-MTCH configuration list and a second SC-MTCH configuration list, each SC-MTCH in the first SC-MTCH configuration list is an SC-MTCH that supports multi-TB scheduling, SC-MTCHs in the first SC-MTCH configuration list may perform multi-transport block scheduling, each SC-MTCH in the second SC-MTCH configuration list is an SC-MTCH that does not support multi-TB scheduling, and the second SC-MTCH configuration list may perform multi-transport block scheduling, namely, single transport block scheduling. Therefore, in this embodiment of this application, a plurality of types of scheduling manners are compatible.

Alternatively, 206: When the first gap includes a gap part that overlaps with the downlink gap, the network device determines that the gap part that is included in the first gap and that overlaps with the downlink gap belongs to the downlink gap.

In this embodiment of this application, when the first gap includes the gap part that overlaps with the downlink gap, the network device determines that the gap part that is included in the first gap and that overlaps with the downlink gap belongs to the downlink gap, that is, the gap part that is included in the first gap and that overlaps with the downlink gap has belonged to the downlink gap, so that the terminal device can determine the first gap between the N transport blocks. Because the gap part that is in the first gap and that overlaps with the downlink gap belongs to the downlink gap, a transport block may be transmitted after the downlink gap, to improve efficiency of transmitting the transport block.

In some embodiments of this application, the first gap is the gap after the every two transport blocks in the N transport blocks. When the first gap includes the gap part that overlaps with the downlink gap, the network device determines that the gap part that is included in the first gap and that overlaps with the downlink gap belongs to the downlink gap.

For example, it can be learned from analysis of the first gap that, if the first gap is the fixed gap of 20 ms inserted after the every two TBs, the two transport blocks are transmitted back to back (that is, continuously transmitted) in this scenario. In this case, an issue that a same transport block is sent only once for a first-type UE and a second-type UE does not need to be considered. Therefore, when the gap of 20 ms overlaps with the DL gap, the overlapped gap part is counted into the DL gap. In this case, compared with a case of postponing the overlapped part, this embodiment of this application can improve transmission efficiency.

It should be noted that, in this embodiment of this application, after determining the first gap, the network device sends a transport block after the first gap, where the transport block carries downlink data, so that the terminal device can receive the transport block after the first gap, and further receive the downlink data carried in the transport block.

In some embodiments of this application, the gap determining method performed by the network device further includes the following step.

The network device sends indication information to the terminal device, where when the indication information indicates a first state, the indication information indicates the terminal device to determine, when the terminal device determines that the preset condition is satisfied, that the gap part that is included in the first gap and that overlaps with the downlink gap is postponed in time domain and that the gap part obtained through postponing does not overlap with the downlink gap; or when the indication information indicates a second state, the indication information indicates the terminal device to determine, when the first gap includes the gap part that overlaps with the downlink gap, that the gap part that is included in the first gap and that overlaps with the downlink gap belongs to the downlink gap.

The network device may send the indication information to the terminal device. The indication information may indicate a manner of determining the first gap to the terminal device. For example, the terminal device determines, based on the indication information, to perform step 215 or step 216. For example, the network device generates indication information, where the indication information may indicate one of the following states: the first state and the second state. For example, a value of the first status is 1, and a value of the second status is 0. When the indication information indicates the first state, the terminal device is triggered to perform step 215. When the indication information indicates the second state, the terminal device is triggered to perform step 216. The network device indicates, by using the indication information, the manner of determining the first gap to the terminal device, so that the terminal device can determine the first gap based on the indication information, to resolve the problem that the first gap cannot be determined currently.

215: When the terminal device determines that the preset condition is satisfied, the terminal device determines that the gap part that is included in the first gap and that overlaps with the downlink gap is postponed in time domain and that the gap part obtained through postponing does not overlap with the downlink gap, where the preset condition includes that the first gap includes the gap part that overlaps with the downlink gap.

In this embodiment of this application, when the first gap includes the gap part that overlaps with the downlink gap, the terminal device determines that the gap part that is included in the first gap and that overlaps with the downlink gap is postponed in time domain and that the gap part obtained through postponing does not overlap with the downlink gap. In addition, the terminal device may further perform a process of determining whether the preset condition is satisfied. This is not limited. When the terminal device determines that the preset condition is satisfied, the terminal device determines that the gap part that is included in the first gap and that overlaps with the downlink gap is postponed in time domain and that the gap part obtained through postponing does not overlap with the downlink gap. When the terminal device determines that the preset condition is not satisfied, the terminal device does not perform step 215.

In this embodiment of this application, the first gap is the gap between the N transport blocks, and the downlink gap is the gap of the first channel. In this case, the first gap may overlap with the downlink gap. In this embodiment of this application, the gap that is included in the first gap and that overlaps with the downlink gap is referred to as the "gap part". The gap part is the sub-gap that is in the first gap and that overlaps with the downlink gap. For example, the first gap may completely overlap with the downlink gap. That is, all the gap parts of the first gap overlap with the downlink gap. FIG. 6 is the schematic diagram of the composition parts of the first gap according to this embodiment of this application. Only the part of the first gap overlaps with the downlink gap. In this case, the first gap may include the two parts: the gap part that overlaps with the downlink gap and the non-overlapped gap. The postponing in step 215 is postponing, in time domain, the gap part that is included in the first gap and that overlaps with the downlink gap, and that the gap part obtained through postponing does not overlap with the downlink gap needs to remain.

In this embodiment of this application, the gap part that is included in the first gap and that overlaps with the downlink gap needs to be postponed in time domain, and the gap part obtained through postponing does not overlap with the downlink gap. The postponing means postponing, in time domain, the gap part that is included in the first gap and that overlaps with the downlink gap to the time domain position that does not overlap with the downlink gap. For example, in step 212, the terminal device supports multi-transport block scheduling, and the scheduling information received by the terminal device may be used to schedule the plurality of transport blocks. After the gap part that is included in the first gap and that overlaps with the downlink gap is postponed, the gap part that is included in the first gap and that overlaps with the downlink gap may be used by the terminal device to send another piece of scheduling information. The another piece of scheduling information may be used to schedule the transport block for the terminal device that supports single transport block scheduling. When the transport block is transmitted after the first gap, the repeat transmission of the same transport block can be avoided, and the network resource overheads can be reduced.

Alternatively, 216: When the first gap includes the gap part that overlaps with the downlink gap, the terminal device determines that the gap part that is included in the first gap and that overlaps with the downlink gap belongs to the downlink gap.

In this embodiment of this application, when the first gap includes the gap part that overlaps with the downlink gap, the terminal device determines that the gap part that is included in the first gap and that overlaps with the downlink gap belongs to the downlink gap, that is, the gap part that is included in the first gap and that overlaps with the downlink gap has belonged to the downlink gap, so that the terminal device can determine the first gap between the N transport blocks. Because the gap part that is in the first gap and that overlaps with the downlink gap belongs to the downlink gap, the transport block may be transmitted after the downlink gap, to improve efficiency of transmitting the transport block.

In some embodiments of this application, the first gap is the gap after the every two transport blocks in the N transport blocks. When the first gap includes the gap part that overlaps with the downlink gap, the terminal device determines that the gap part that is included in the first gap and that overlaps with the downlink gap belongs to the downlink gap.

For example, it can be learned from analysis of the first gap that, if the first gap is the fixed gap of 20 ms inserted after the every two TBs, the two transport blocks are transmitted back to back (that is, continuously transmitted) in this scenario. In this case, the issue that the same transport block is sent only once for the first-type UE and the second-type UE does not need to be considered. Therefore, when the gap of 20 ms overlaps with the DL gap, the overlapped gap part is counted into the DL gap. In this case, compared with the case of postponing the overlapped part, this embodiment of this application can improve transmission efficiency.

It should be noted that, in this embodiment of this application, after determining the first gap, the network device sends the transport block after the first gap, where the transport block carries the downlink data, so that the terminal device can receive the transport block after the first gap, and further receive the downlink data carried in the transport block.

In some embodiments of this application, the gap determining method performed by the terminal device further includes the following steps.

The terminal device receives the indication information from the network device.

When the indication information indicates the first state, performing of step 215 is triggered: When the terminal device determines that the preset condition is satisfied, the terminal device determines that the gap part that is included in the first gap and that overlaps with the downlink gap is postponed in time domain and that the gap part obtained through postponing does not overlap with the downlink gap.

Alternatively, when the indication information indicates the second state, performing of step 216 is triggered: When the first gap includes the gap part that overlaps with the downlink gap, the terminal device determines that the gap part that is included in the first gap and that overlaps with the downlink gap belongs to the downlink gap.

The terminal device may further receive the indication information from the network device, and determine, based on the indication information, to perform step 215 or step 216. For example, the network device generates indication information, where the indication information may indicate one of the following states: the first state and the second state. For example, the value of the first status is 1, and the value of the second status is 0. When the indication information indicates the first state, performing of step 215 is triggered; or when the indication information indicates the second state, performing of step 216 is triggered. The terminal device can determine the first gap based on the indication information, to resolve the problem that the first gap cannot be determined currently.

For example, DCI includes the indication information. The UE determines, based on the indication information, that the first gap is used as the part of the transmission of the NPDSCH that carries the N TBs. When the DL gap overlaps with the first gap, the overlapped part in the first gap is postponed. Alternatively, the UE determines, based on the indication information, that the first gap is not used as the part of the transmission of the NPDSCH that carries the N TBs. When the DL gap overlaps with the first gap, the overlapped part in the first gap is not postponed. In other words, when the DL gap overlaps with the first gap, the overlapped part in the first gap is counted into the DL gap. The base station indicates, by using the indication information, a manner of processing a collision between the first gap and the DL gap. Implementation of the base station is more flexible, and the base station can choose, based on a requirement, to save a network resource or complete multicast transmission as soon as possible.

In addition to being sent by using the DCI, the indication information may be notified by the network device by using an RRC message. This is not limited. The RRC message may be configured for each SC-MTCH.

In some embodiments of this application, the gap determining method performed by the terminal device further includes the following steps.

The terminal device receives, from the network device, a configuration parameter of common search space (common search space, CSS), where the common search space includes type 2A common search space.

The terminal device skips monitoring a downlink control channel in the type 2A common search space in the first gap.

In an NB-IoT system, the type 2A common search space may be type 2A narrowband physical downlink control channel (narrowband physical downlink control channel, NPDCCH) common search space.

For the type 2A common search space, the terminal device does not monitor the downlink control channel in the type 2A common search space, to reduce power consumption of the terminal device. For example, the UE does not monitor the downlink control channel or a downlink control channel candidate in the type 2A NPDCCH common search space in the first gap or the gap of 20 ms. This can reduce power consumption of the UE.

In some embodiments of this application, the gap determining method performed by the terminal device further includes the following step.

The terminal device skips monitoring a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20.

After the terminal device receives the first transport block, the terminal device decodes the first transport block. In this case, the terminal device does not need to monitor the downlink control channel, so that processing complexity of the terminal device can be reduced, and power consumption of the terminal device can be reduced. For example, for N TBs scheduled by using one piece of DCI, an ending moment of transmission of a UE on a downlink shared channel that carries a TB i is a subframe n, and the UE does not monitor the downlink control channel or a downlink control channel candidate from the subframe n to a subframe n+k, where k may be 12 ms or 20 ms, so that processing complexity of the UE is reduced, and the UE is prevented from monitoring the downlink control channel when decoding the TB i. In addition, power consumption of the UE can be reduced.

It can be learned from the descriptions of the examples in the foregoing embodiment that the network device sends the first configuration information and the second configuration information to the terminal device, where the first configuration information is used to indicate the gap of the transport channel, and the second configuration information is used to indicate the gap between the transport blocks. The network device further sends the scheduling information to the terminal device, where the scheduling information is used to schedule the N transport blocks carried on the first channel. The terminal device may determine the downlink gap of the first channel based on the received first configuration information. The terminal device may further determine the first gap between the N transport blocks based on the second configuration information. The preset condition provided in this embodiment of this application includes that the first gap includes the gap part that overlaps with the downlink gap. When the terminal device determines that the preset condition is satisfied, the terminal device determines that the gap part that is included in the first gap and that overlaps with the downlink gap is postponed in time domain and that the gap part obtained through postponing does not overlap with the downlink gap, so that the terminal device can determine the first gap between the N transport blocks. Further, in a backward compatibility scenario, when the network device needs to send the N transport blocks to each of the two types of terminal devices, the first-type terminal device supports scheduling that is of the N transport blocks and that is performed by using one piece of scheduling information, and the second-type terminal device supports scheduling that is of the N transport blocks and that is performed by using N pieces of scheduling information. After the $1^{st}$ transport block in the N transport blocks, the network device needs an additional resource to send N−1 pieces of scheduling information for N−1 transport blocks after the $1^{st}$ transport block to the second-type terminal device. According to the solution in this embodiment, the gap part that is included in the first gap and that overlaps with the downlink gap is postponed in time domain, so that the network device can send the N−1 pieces of scheduling information in the gap part obtained through postponing. If the gap part that is included in the first gap and that overlaps with the downlink gap is not postponed in time domain, the network device has no resource to send the N−1 pieces of scheduling information. Therefore, the second-type terminal device cannot receive the N−1 transport blocks after the transport block at a same resource position as the first-type terminal device, and the network device can send the N−1 pieces of scheduling information and the N−1 transport blocks after the $1^{st}$ transport block to the second terminal device only at another resource position. That is, the network device transmits the N−1 transport blocks after the $1^{st}$ transport block twice. Therefore, according to the solution in this embodiment, the repeat transmission of the same transport block can be avoided, and the network resource overheads can be reduced. Alternatively, in this embodiment of this application, when the first gap includes the gap part that overlaps with the downlink gap, the terminal device determines that the gap part that is included in the first gap and that overlaps with the downlink gap belongs to the downlink gap, so that the terminal device can determine the first gap between the N transport blocks. Because the gap part that is in the first gap and that overlaps with the downlink gap belongs to the downlink gap, the transport block may be transmitted after the downlink gap, to improve efficiency of transmitting the transport block.

It should be noted that, for brief description, the foregoing method embodiments are all expressed as a series of actions. However, a person skilled in the art should appreciate that this application is not limited to the described order of the actions, because according to this application, some steps may be performed in other orders or simultaneously. A person skilled in the art should further know that embodiments described in this specification are all example embodiments, and the related actions and modules are not necessarily required by this application.

To better implement the solutions in embodiments of this application, a related apparatus for implementing the solutions is further provided below.

Figure 15:
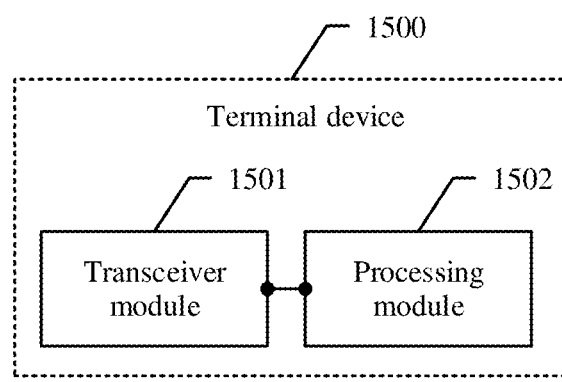
FIG. 15 is a schematic diagram of a composition structure of a terminal device according to an embodiment of this application.

FIG. 15 is a schematic diagram of a composition structure of a terminal device according to an embodiment of this application. The terminal device 1500 includes a transceiver module 1501 and a processing module 1502.

The transceiver module is configured to receive first configuration information and second configuration information from a network device, where the first configuration information is used to indicate a gap of a transport channel, and the second configuration information is used to indicate a gap between transport blocks.

The transceiver module is further configured to receive scheduling information from the network device, where the scheduling information is used to schedule N transport blocks carried on a first channel, and N is a positive integer.

The processing module is configured to determine a downlink gap of the first channel based on the first configuration information.

The processing module is further configured to determine a first gap between the N transport blocks based on the second configuration information.

The processing module is further configured to: when determining that a preset condition is satisfied, determine that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap.

Alternatively, the processing module is further configured to: when the first gap includes a gap part that overlaps with the downlink gap, determine that the gap part that is included in the first gap and that overlaps with the downlink gap belongs to the downlink gap.

In some embodiments of this application, the preset condition further includes at least one of the following:

A value of N is greater than or equal to a first threshold, where the first threshold includes one of the following values: 2, 3, 4, 5, 6, 7, or 8;

duration of the first gap is greater than or equal to a second threshold, where the second threshold is a preset value, or the second threshold is a value notified by the network device to the terminal device;

duration of the first gap is less than or equal to duration of the downlink gap;

starting positions of the first gap and the downlink gap are the same; or the N transport blocks are scheduled in a first manner and a second manner, where the first manner is multi-transport block scheduling, and the second manner is not multi-transport block scheduling.

In some embodiments of this application, the transceiver module is further configured to receive indication information from the network device.

The processing module is further configured to: when the indication information indicates a first state, trigger performing of the following step: when determining that the preset condition is satisfied, determining that the gap part that is included in the first gap and that overlaps with the downlink gap is postponed in time domain and that the gap part obtained through postponing does not overlap with the downlink gap.

Alternatively, the processing module is further configured to: when the indication information indicates a second state, trigger performing of the following step: when the first gap includes the gap part that overlaps with the downlink gap, determining that the gap part that is included in the first gap and that overlaps with the downlink gap belongs to the downlink gap.

In some embodiments of this application, the first gap is a gap after each transport block in the N transport blocks.

In some embodiments of this application, the first gap is a gap after every two transport blocks in the N transport blocks; and the processing module is further configured to: when the first gap includes the gap part that overlaps with the downlink gap, determine that the gap part that is included in the first gap and that overlaps with the downlink gap belongs to the downlink gap.

In some embodiments of this application, the transceiver module is further configured to receive, from the network device, a configuration parameter of common search space, where the common search space includes type 2A common search space.

The processing module is further configured to skip monitoring a downlink control channel in the type 2A common search space in the first gap.

In some embodiments of this application, the processing module is further configured to skip monitoring a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20.

It can be learned from the descriptions of the examples in the foregoing embodiment that the network device sends the first configuration information and the second configuration information to the terminal device, where the first configuration information is used to indicate the gap of the transport channel, and the second configuration information is used to indicate the gap between the transport blocks. The network device further sends the scheduling information to the terminal device, where the scheduling information is used to schedule the N transport blocks carried on the first channel. The terminal device may determine the downlink gap of the first channel based on the received first configuration information. The terminal device may further determine the first gap between the N transport blocks based on the second configuration information. The preset condition provided in this embodiment of this application includes that the first gap includes the gap part that overlaps with the downlink gap. When the terminal device determines that the preset condition is satisfied, the terminal device determines that the gap part that is included in the first gap and that overlaps with the downlink gap is postponed in time domain and that the gap part obtained through postponing does not overlap with the downlink gap, so that the terminal device can determine the first gap between the N transport blocks. Further, in a backward compatibility scenario, when the network device needs to send the N transport blocks to each of two types of terminal devices, a first-type terminal device supports scheduling that is of the N transport blocks and that is performed by using one piece of scheduling information, and a second-type terminal device supports scheduling that is of the N transport blocks and that is performed by using N pieces of scheduling information. After the $1^{st}$ transport block in the N transport blocks, the network device needs an additional resource to send N−1 pieces of scheduling information for N−1 transport blocks after the $1^{st}$ transport block to the second-type terminal device. According to the solution in this embodiment, the gap part that is included in the first gap and that overlaps with the downlink gap is postponed in time domain, so that the network device can send the N−1 pieces of scheduling information in the gap part obtained through postponing. If the gap part that is included in the first gap and that overlaps with the downlink gap is not postponed in time domain, the network device has no resource to send the N−1 pieces of scheduling information. Therefore, the second-type terminal device cannot receive the N−1 transport blocks after the $1^{st}$ transport block at a same resource position as the first-type terminal device, and the network device can send the N−1 pieces of scheduling information and the N−1 transport blocks after the $1^{st}$ transport block to the second terminal device only at another resource position. That is, the network device transmits the N−1 transport blocks after the $1^{st}$ transport block twice. Therefore, according to the solution in this embodiment, repeat transmission of a same transport block can be avoided, and network resource overheads can be reduced. Alternatively, in this embodiment of this application, when the first gap includes the gap part that overlaps with the downlink gap, the terminal device determines that the gap part that is included in the first gap and that overlaps with the downlink gap belongs to the downlink gap, so that the terminal device can determine the first gap between the N transport blocks. Because the gap part that is in the first gap and that overlaps with the downlink gap belongs to the downlink gap, a transport block may be transmitted after the downlink gap, to improve efficiency of transmitting the transport block.

Figure 16:
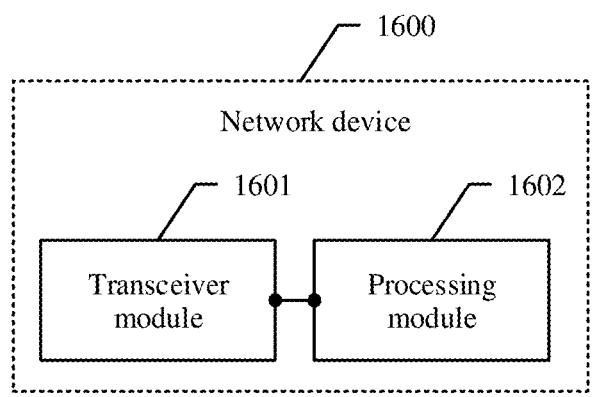
FIG. 16 is a schematic diagram of a composition structure of a network device according to an embodiment of this application.

FIG. 16 is a schematic diagram of a composition structure of a network device according to an embodiment of this application. The network device 1600 includes a transceiver module 1601 and a processing module 1602.

The processing module is configured to determine first configuration information, where the first configuration information is used to indicate a gap of a first channel, the first channel carries N transport blocks, and N is a positive integer.

The processing module is further configured to determine second configuration information, where the second configuration information is used to indicate a first gap between the N transport blocks.

The transceiver module is configured to send the first configuration information and the second configuration information to a terminal device.

The transceiver module is further configured to send scheduling information to the terminal device, where the scheduling information is used to schedule the N transport blocks The processing module is further configured to: when determining that a preset condition is satisfied, determine that a gap part that is included in the first gap and that overlaps with the downlink gap is postponed in time domain and that a gap part obtained through postponing does not overlap with the downlink gap, where the preset condition includes that the first gap includes the gap part that overlaps with the downlink gap.

Alternatively, the processing module is further configured to: when the first gap includes a gap part that overlaps with the downlink gap, determine that the gap part that is included in the first gap and that overlaps with the downlink gap belongs to the downlink gap.

In some embodiments of this application, the preset condition further includes at least one of the following:

A value of N is greater than or equal to a first threshold, where the first threshold includes one of the following values: 2, 3, 4, 5, 6, 7, or 8;
  duration of the first gap is greater than or equal to a second threshold, where the second threshold is a preset value, or the second threshold is a value notified by the network device to the terminal device;
  duration of the first gap is less than or equal to duration of the downlink gap;
  starting positions of the first gap and the downlink gap are the same; or
  the N transport blocks are scheduled in a first manner and a second manner, where the first manner is multi-transport block scheduling, and the second manner is not multi-transport block scheduling.

In some embodiments of this application, the transceiver module is further configured to send indication information to the terminal device, where when the indication information indicates a first state, the indication information indicates the terminal device to determine, when the terminal device determines that the preset condition is satisfied, that the gap part that is included in the first gap and that overlaps with the downlink gap is postponed in time domain and that the gap part obtained through postponing does not overlap with the downlink gap; or when the indication information indicates a second state, the indication information indicates the terminal device to determine, when the first gap includes the gap part that overlaps with the downlink gap, that the gap part that is included in the first gap and that overlaps with the downlink gap belongs to the downlink gap.

In some embodiments of this application, the first gap is a gap after each transport block in the N transport blocks.

In some embodiments of this application, the first gap is a gap after every two transport blocks in the N transport blocks; and the processing module is further configured to: when the first gap includes the gap part that overlaps with the downlink gap, determine that the gap part that is included in the first gap and that overlaps with the downlink gap belongs to the downlink gap.

In some embodiments of this application, the transceiver module is further configured to send a configuration parameter of common search space to the terminal device, where the common search space includes type 2A common search space.

The processing module is further configured to skip sending a downlink control channel in the type 2A common search space in the first gap.

In some embodiments of this application, the processing module is further configured to skip sending a downlink control channel in k subframes between an $m^{th}$ subframe and an $(m+k+1)^{th}$ subframe, where the $m^{th}$ subframe is an ending subframe of the first channel that carries a first transport block, the first transport block is one transport block in the N transport blocks, and k is 12 or 20.

It can be learned from the descriptions of the examples in the foregoing embodiment that the network device sends the first configuration information and the second configuration information to the terminal device, where the first configuration information is used to indicate the gap of the transport channel, and the second configuration information is used to indicate the gap between the transport blocks. The network device further sends the scheduling information to the terminal device, where the scheduling information is used to schedule the N transport blocks carried on the first channel. The terminal device may determine the downlink gap of the first channel based on the received first configuration information. The terminal device may further determine the first gap between the N transport blocks based on the second configuration information. The preset condition provided in this embodiment of this application includes that the first gap includes the gap part that overlaps with the downlink gap. When the terminal device determines that the preset condition is satisfied, the terminal device determines that the gap part that is included in the first gap and that overlaps with the downlink gap is postponed in time domain and that the gap part obtained through postponing does not overlap with the downlink gap, so that the terminal device can determine the first gap between the N transport blocks. Further, in a backward compatibility scenario, when the network device needs to send the N transport blocks to each of two types of terminal devices, a first-type terminal device supports scheduling that is of the N transport blocks and that is performed by using one piece of scheduling information, and a second-type terminal device supports scheduling that is of the N transport blocks and that is performed by using N pieces of scheduling information. After the $1^{st}$ transport block in the N transport blocks, the network device needs an additional resource to send N−1 pieces of scheduling information for N−1 transport blocks after the $1^{st}$ transport block to the second-type terminal device. According to the solution in this embodiment, the gap part that is included in the first gap and that overlaps with the downlink gap is postponed in time domain, so that the network device can send the N−1 pieces of scheduling information in the gap part obtained through postponing. If the gap part that is included in the first gap and that overlaps with the downlink gap is not postponed in time domain, the network device has no resource to send the N−1 pieces of scheduling information. Therefore, the second-type terminal device cannot receive the N−1 transport blocks after the $1^{st}$ transport block at a same resource position as the first-type terminal device, and the network device can send the N−1 pieces of scheduling information and the N−1 transport blocks after the $1^{st}$ transport block to the second terminal device only at another resource position. That is, the network device transmits the N−1 transport blocks after the $1^{st}$ transport block twice. Therefore, according to the solution in this embodiment, repeat transmission of a same transport block can be avoided, and network resource overheads can be reduced. Alternatively, in this embodiment of this application, when the first gap includes the gap part that overlaps with the downlink gap, the terminal device determines that the gap part that is included in the first gap and that overlaps with the downlink gap belongs to the downlink gap, so that the terminal device can determine the first gap between the N transport blocks. Because the gap part that is in the first gap and that overlaps with the downlink gap belongs to the downlink gap, a transport block may be transmitted after the downlink gap, to improve efficiency of transmitting the transport block.

An embodiment of this application further provides a computer storage medium. The computer storage medium stores a program. The program is executed to perform some or all of the steps recorded in the method embodiment.

Figure 17:
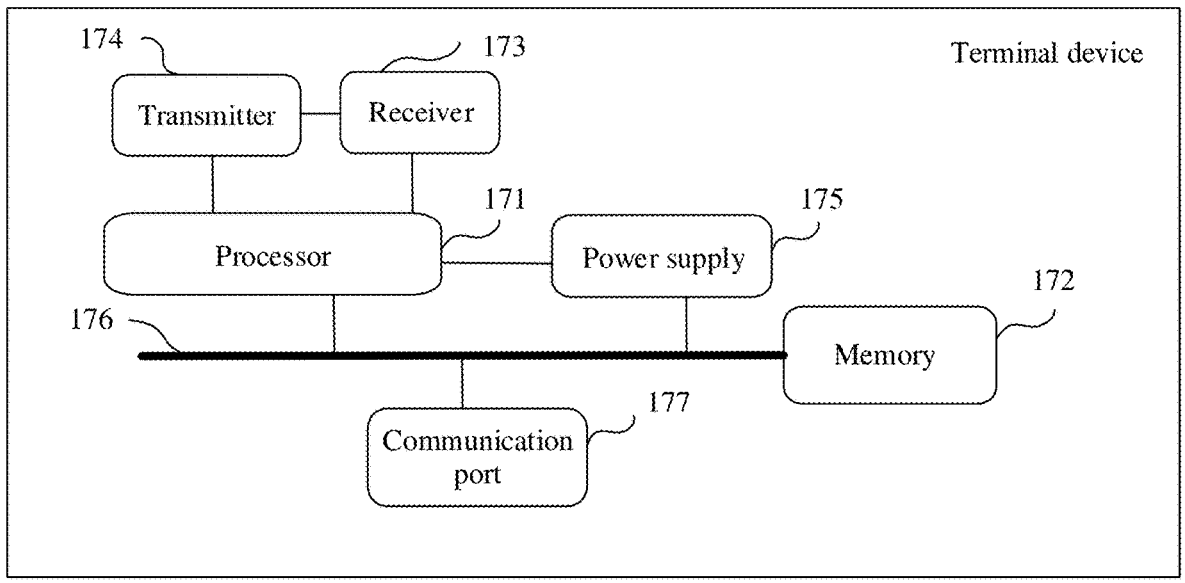
FIG. 17 is a schematic diagram of a composition structure of another terminal device according to an embodiment of this application.

FIG. 17 is a schematic diagram of a structure of a first communication device according to an embodiment of this application. The first communication device is a terminal device. The terminal device may include a processor 171 (for example, a CPU), a memory 172, a transmitter 174, and a receiver 173. The transmitter 174 and the receiver 173 are coupled to the processor 171. The processor 171 controls a sending action of the transmitter 174 and a receiving action of the receiver 173. The memory 172 may include a high-speed RAM memory, or may further include a nonvolatile memory NVM, for example, at least one magnetic disk memory. The memory 172 may store various instructions, to implement various processing functions and method steps in embodiments of this application. Optionally, the terminal device in this embodiment of this application may further include one or more of a power supply 175, a communication bus 176, and a communication port 177. The receiver 173 and the transmitter 174 may be integrated into a transceiver of the terminal device, or may be a receive antenna and a transmit antenna that are independent of each other on the terminal device. The communication bus 176 is configured to implement communication connections between the components. The communication port 177 is configured to implement a connection and communication between the terminal device and another peripheral.

In this embodiment of this application, the memory 172 is configured to store computer executable program code. The program code includes instructions. When the processor 171 executes the instructions, the instructions enable the processor 171 to perform a processing action of the terminal device in the foregoing method embodiment shown in FIG. 2A and FIG. 2B, and enable the transmitter 174 to perform a sending action of the terminal device in the foregoing method embodiment. An implementation principle and a technical effect of this embodiment are similar to those of the foregoing method embodiment. Details are not described herein again.

Figure 18:
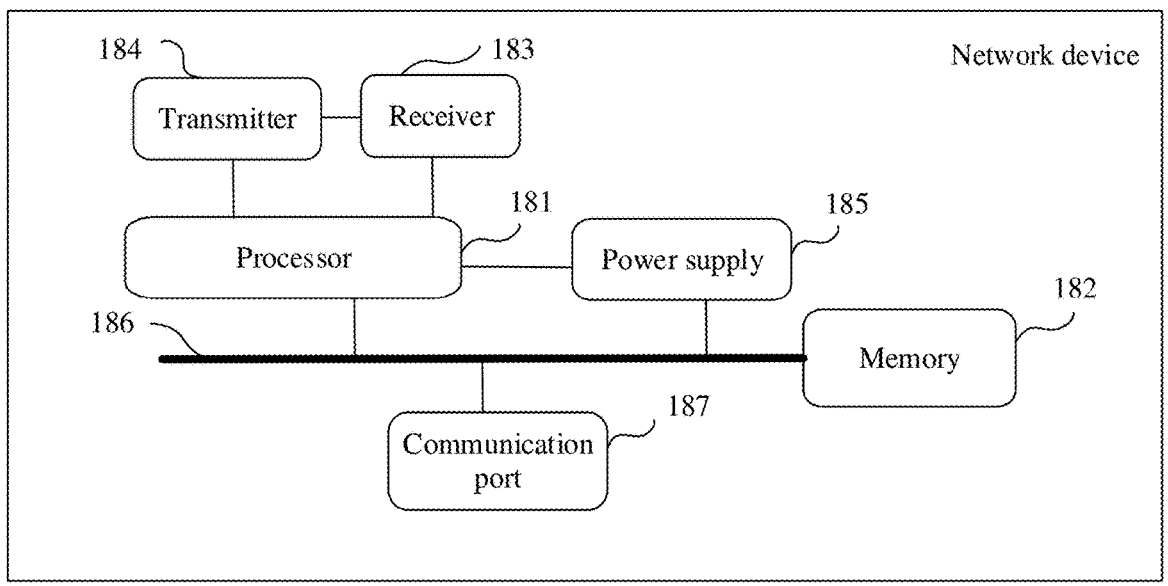
FIG. 18 is a schematic diagram of a composition structure of another network device according to an embodiment of this application.

FIG. 18 is a schematic diagram of a structure of a second communication device according to an embodiment of this application. The second communication device is a network device. The network device may include a processor (for example, a CPU) 181, a memory 182, a receiver 183, and a transmitter 184. The receiver 183 and the transmitter 184 are coupled to the processor 181, and the processor 181 controls a receiving action of the receiver 183 and a sending action of the transmitter 184. The memory 182 may include a high-speed RAM memory, or may further include a non-volatile memory NVM, for example, at least one magnetic disk memory. The memory 182 may store various instructions, to implement various processing functions and method steps in embodiments of this application. Optionally, the network device in this embodiment of this application may further include one or more of a power supply 185, a communication bus 186, and a communication port 187. The receiver 183 and the transmitter 184 may be integrated into a transceiver of the network device, or may be a receive antenna and a transmit antenna that are independent of each other on the network device. The communication bus 186 is configured to implement communication connection between the components. The communication port 187 is configured to implement a connection and communication between the network device and another peripheral.

In this embodiment of this application, the memory 182 is configured to store computer executable program code. The program code includes instructions. When the processor 181 executes the instructions, the instructions enable the processor 181 to perform a processing action of the network device in the foregoing method embodiment shown in FIG. 2A and FIG. 2B, and enable the transmitter 184 to perform a sending action of the network device in the foregoing method embodiment. An implementation principle and a technical effect of this embodiment are similar to those of the foregoing method embodiment. Details are not described herein again.

In another possible design, when the communication device is a terminal device or a chip in the terminal device, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the terminal performs the gap determining method in any possible implementation of the first aspect. Optionally, the storage unit is a storage unit in the chip, for example, a register or a cache. Alternatively, the storage unit may be a storage unit that is in the terminal and that is located outside the chip, for example, a read-only memory (read-only memory, ROM), another type of static storage device that can store static information and instructions, or a random access memory (random access memory, RAM).

The processor mentioned anywhere above may be a general-purpose central processing unit (CPU), a microprocessor, an application-specific integrated circuit (application-specific integrated circuit, ASIC), or one or more integrated circuits for controlling program execution of the gap determining method according to the first aspect.

In addition, it should be noted that the foregoing apparatus embodiments are merely examples. The units described as separate parts may or may not be physically separate, and parts displayed as units may or may not be physical units, that is, may be located in one position, or may be distributed on a plurality of network units. Some or all the modules may be selected based on an actual requirement to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables. A person of ordinary skill in the art may understand and implement embodiments without creative efforts.

Based on the descriptions of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any function that is implemented by a computer program can be easily implemented by using corresponding hardware. Moreover, a specific hardware structure used to achieve a same function may be of various forms, for example, in a form of an analog circuit, a digital circuit, or a dedicated circuit. However, in this application, a software program implementation is a better implementation in most cases. Based on such an understanding, the technical solutions in this application essentially or the part contributing to the prior art may be implemented in a form of a software product. The computer software product is stored in a readable storage medium, for example, a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods in embodiments of this application.

All or some of embodiments may be implemented by using software, hardware, firmware, or any combination thereof. When the software is used to implement embodiments, embodiments may be implemented completely or partially in a form of a computer program product.

The computer program product includes one or more computer instructions. When the computer program instructions are loaded and executed on a computer, a procedure or function according to embodiments of this application is all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A gap determining method, comprising:
receiving first configuration information and second configuration information from a network device, wherein the first configuration information is used to indicate a gap of a transport channel, and the second configuration information is used to indicate a gap between transport blocks;
receiving scheduling information from the network device, wherein the scheduling information is used to schedule N transport blocks carried on a first channel, and N is a positive integer;
determining a downlink gap of the first channel based on the first configuration information;
determining whether a first gap exists between the N transport blocks based on the second configuration information; and
in response to determining that a preset condition is satisfied, determining that a first gap part that is included in the first gap and that overlaps with the downlink gap is postponed in a time domain and that a second gap part obtained through postponing does not overlap with the downlink gap, wherein the preset condition comprises that the first gap includes the first gap part that overlaps with the downlink gap; or
in response to determining the first gap includes the first gap part that overlaps with the downlink gap, determining that the first gap part included in the first gap and that overlaps with the downlink gap belongs to the downlink gap.

2. The gap determining method according to claim 1, wherein the preset condition further comprises at least one of the following:
- a value of N is greater than or equal to a first threshold, wherein the first threshold comprises one of the following values: 2, 3, 4, 5, 6, 7, or 8;
- a duration of the first gap is greater than or equal to a second threshold, wherein the second threshold is a preset value known to a terminal device, or the second threshold is a communicated value notified by the network device to the terminal device;
- the duration of the first gap is less than or equal to a duration of the downlink gap;
- starting positions of the first gap and the downlink gap are the same; or
- the N transport blocks are scheduled in a first manner and a second manner, wherein the first manner is multi-transport block scheduling, and the second manner is not multi-transport block scheduling.

3. The gap determining method according to claim 1, wherein the first gap exists after each transport block except a last transport block in the N transport blocks, and there is no gap after the last transport block in the N transport blocks.

4. The gap determining method according to claim 1, wherein
the first gap exists after every two transport blocks in the N transport blocks; and
in response to determining the first gap includes the first gap part that overlaps with the downlink gap, determining that the first gap part that is included in the first gap and that overlaps with the downlink gap belongs to the downlink gap.

5. The gap determining method according to claim 1, further comprising:
receiving, from the network device, a configuration parameter of a common search space, wherein the common search space comprises type 2A common search space; and
skipping monitoring a downlink control channel in the type 2A common search space in the first gap.

6. A gap determining method, comprising:
determining first configuration information, wherein the first configuration information is used to indicate a gap of a first channel, the first channel carries N transport blocks, and N is a positive integer;
determining second configuration information, wherein the second configuration information is used to indicate a first gap exists between the N transport blocks;
sending the first configuration information and the second configuration information to a terminal device;
sending scheduling information to the terminal device, wherein the scheduling information is used to schedule the N transport blocks; and
in response to determining that a preset condition is satisfied, determining that a first gap part that is included in the first gap and that overlaps with a downlink gap is postponed in a time domain and that a second gap part obtained through postponing does not overlap with the downlink gap, wherein the preset condition comprises that the first gap includes the first gap part that overlaps with the downlink gap; or
in response to determining the first gap includes the first gap part that overlaps with the downlink gap, determining that the first gap part included in the first gap and that overlaps with the downlink gap belongs to the downlink gap.

7. The gap determining method according to claim 6, wherein the first gap exists after each transport block except a last transport block in the N transport blocks, and there is no gap after the last transport block in the N transport blocks.

8. The gap determining method according to claim 6, wherein
the first gap exists after every two transport blocks in the N transport blocks; and
in response to determining the first gap includes the first gap part that overlaps with the downlink gap, determining that the first gap part that is included in the first gap and that overlaps with the downlink gap belongs to the downlink gap.

9. The gap determining method according to claim 6, further comprising:
sending a configuration parameter of a common search space to the terminal device, wherein the common search space comprises type 2A common search space; and
skipping sending a downlink control channel in the type 2A common search space in the first gap.

10. The gap determining method according to claim 6, further comprising:
skipping sending a downlink control channel in k subframes between an $m^{th}$ subframe and an $(m+k+1)^{th}$ subframe, wherein the $m^{th}$ subframe is an ending subframe of the first channel that carries a first transport block, the first transport block is one transport block in the N transport blocks, and k is 12 or 20.

11. A communication apparatus, comprising:
a transceiver;
at least one processor; and
one or more memories coupled to the at least one processor and storing programming instructions that, when executed by the at least one processor, cause the communication apparatus to:
receive, through the transceiver, first configuration information and second configuration information from a network device, wherein the first configuration information is used to indicate a gap of a transport channel, and the second configuration information is used to indicate a gap between transport blocks;
receive, through the transceiver, scheduling information from the network device, wherein the scheduling information is used to schedule N transport blocks carried on a first channel, and N is a positive integer; and
determine a downlink gap of the first channel based on the first configuration information;
determine a first gap exists between the N transport blocks based on the second configuration information; and
in response to determining that a preset condition is satisfied, determine that a first gap part that is included in the first gap and that overlaps with the downlink gap is postponed in a time domain and that a second gap part obtained through postponing does not overlap with the downlink gap, wherein the preset condition comprises that the first gap includes the first gap part that overlaps with the downlink gap; or
in response to determining the first gap includes the first gap part that overlaps with the downlink gap, determine that the first gap part included in the first gap and that overlaps with the downlink gap belongs to the downlink gap.

12. The communication apparatus according to claim 11, wherein the programming instructions, when executed by the at least one processor, further cause the apparatus to:
- receive, through the transceiver, indication information from the network device; and
- in response to determining the indication information indicates a first state, trigger determining the preset condition is satisfied, and determining that the first gap part that is included in the first gap and that overlaps with the downlink gap is postponed in the time domain and that the second gap part obtained through postponing does not overlap with the downlink gap; or
- in response to determining the indication information indicates a second state, trigger determining the first gap includes the first gap part that overlaps with the downlink gap, and determining that the first gap part included in the first gap and that overlaps with the downlink gap belongs to the downlink gap.

13. The communication apparatus according to claim 11, wherein the first gap exists after each transport block except a last transport block in the N transport blocks, and there is no gap after the last transport block in the N transport blocks.

14. The communication apparatus according to claim 11, wherein
- the first gap exists after every two transport blocks in the N transport blocks; and
- the programming instructions, when executed by the at least one processor, further cause the communication apparatus to:
  - in response to determining the first gap includes the first gap part that overlaps with the downlink gap, determine that the first gap part that is included in the first gap and that overlaps with the downlink gap belongs to the downlink gap.

15. The communication apparatus according to claim 11, wherein the programming instructions, when executed by the at least one processor, further cause the apparatus to:
- receive, through the transceiver from the network device, a configuration parameter of a common search space, wherein the common search space comprises type 2A common search space; and
- skip monitoring a downlink control channel in the type 2A common search space in the first gap.

16. A network device, comprising:
- a transceiver;
- at least one processor; and
- one or more memories coupled to the at least one processor and storing programming instructions that, when executed by the at least one processor, cause the network device to:
- determine first configuration information, wherein the first configuration information is used to indicate a gap of a first channel, the first channel carries N transport blocks, and N is a positive integer;
- determine second configuration information, wherein the second configuration information is used to indicate a first gap exists between the N transport blocks;
- send, through the transceiver, the first configuration information and the second configuration information to a terminal device;
- send, through the transceiver, scheduling information to the terminal device, wherein the scheduling information is used to schedule the N transport blocks; and
- in response to determining that determining that a preset condition is satisfied, determine that a first gap part that is included in the first gap and that overlaps with a downlink gap is postponed in a time domain and that a second gap part obtained through postponing does not overlap with the downlink gap, wherein the preset condition comprises that the first gap includes the first gap part that overlaps with the downlink gap; or
- in response to determining the first gap includes the first gap part that overlaps with the downlink gap, determine that the first gap part included in the first gap and that overlaps with the downlink gap belongs to the downlink gap.

17. The network device according to claim 16, wherein the preset condition further comprises at least one of the following:
- a value of N is greater than or equal to a first threshold, wherein the first threshold comprises one of the following values: 2, 3, 4, 5, 6, 7, or 8;
- a duration of the first gap is greater than or equal to a second threshold, wherein the second threshold is a preset value known to the terminal device, or the second threshold is a communicated value notified by the network device to the terminal device;
- the duration of the first gap is less than or equal to a duration of the downlink gap;
- starting positions of the first gap and the downlink gap are the same; or
- the N transport blocks are scheduled in a first manner and a second manner, wherein the first manner is multi-transport block scheduling, and the second manner is not multi-transport block scheduling.

18. The network device according to claim 16, wherein the first gap exists after each transport block except a last transport block in the N transport blocks, and there is no gap after the last transport block in the N transport blocks.

19. The network device according to claim 16, wherein
- the first gap exists after every two transport blocks in the N transport blocks; and
- the programming instructions, when executed by the at least one processor, further cause the network device to:
  - in response to determining the first gap includes the first gap part that overlaps with the downlink gap, determine that the first gap part that is included in the first gap and that overlaps with the downlink gap belongs to the downlink gap.

20. The network device according to claim 16, wherein the programming instructions, when executed by the at least one processor, further cause the network device to:
- send, through the transceiver, a configuration parameter of a common search space to the terminal device, wherein the common search space comprises type 2A common search space; and
- skip sending a downlink control channel in the type 2A common search space in the first gap.

* * * * *